United States Patent
Kimura

(10) Patent No.: US 8,154,236 B2
(45) Date of Patent: Apr. 10, 2012

(54) ELECTRIC POWER CONVERSION CIRCUIT, AND CONTROL DEVICE FOR MULTIPHASE ELECTRIC ROTARY MACHINE

(75) Inventor: Tomonori Kimura, Oobu (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/508,161

(22) Filed: Jul. 23, 2009

(65) Prior Publication Data

US 2010/0019705 A1 Jan. 28, 2010

(30) Foreign Application Priority Data

Jul. 28, 2008 (JP) ................................ 2008-193272

(51) Int. Cl.
*H02P 6/14* (2006.01)
(52) U.S. Cl. ................................ 318/400.26; 318/400.3
(58) Field of Classification Search .................. 318/139, 318/400.26, 400.3, 798, 812, 813
See application file for complete search history.

(56) References Cited

U.S. PATENT DOCUMENTS

| | | | | |
|---|---|---|---|---|
| 5,099,406 | A * | 3/1992 | Harada et al. .................... | 363/20 |
| 5,745,351 | A | 4/1998 | Taurand | |
| 6,285,568 | B1 * | 9/2001 | Taurand ...................... | 363/21.14 |
| 6,757,182 | B2 * | 6/2004 | Smidt et al. ................. | 363/21.14 |
| 7,336,057 | B2 * | 2/2008 | Hirabayashi .................. | 323/266 |
| 7,450,402 | B2 * | 11/2008 | Jitaru ............... | 363/20 |
| 2004/0027104 | A1 | 2/2004 | Takuya et al. | |
| 2004/0246750 | A1 | 12/2004 | Ichikawa et al. | |
| 2005/0001659 | A1 | 1/2005 | Inoshita | |
| 2005/0218876 | A1 | 10/2005 | Nino | |
| 2006/0076939 | A1 | 4/2006 | De Boer | |
| 2006/0186933 | A1 | 8/2006 | Kimura et al. | |
| 2008/0278972 | A1 | 11/2008 | Kimura | |

FOREIGN PATENT DOCUMENTS

| | | |
|---|---|---|
| JP | 61-277368 | 12/1986 |
| JP | 08-275513 | 10/1996 |
| JP | 10-285979 | 10/1998 |
| JP | 2001-314075 | 11/2001 |
| JP | 2003-164143 | 6/2003 |
| JP | 2004-343884 | 12/2004 |

(Continued)

OTHER PUBLICATIONS

Japanese Office Action dated Apr. 13, 2010, issued in corresponding Japanese Application No. 2008-193272, with English translation.

*Primary Examiner* — Rina Duda
(74) *Attorney, Agent, or Firm* — Nixon & Vanderhye PC

(57) ABSTRACT

An EPC connected between a three phase motor and a battery fixes a voltage of the V phase of the three phase motor to a voltage potential of a positive electrode of the battery. A converter unit is placed for each of the U and W phases of the three phase motor. Each of the converter units has a chopper circuit part and a capacitor. Each of the converter units converts the voltage of the battery to a desired voltage. The voltage of each of V and W phases is adjusted until the voltage of being twice of the voltage of the battery based on the voltage potential at the positive electrode of the battery as a reference voltage. This makes it possible to adjust the absolute value of a line voltage between V and W phases until the voltage of the battery as an upper limit voltage.

22 Claims, 14 Drawing Sheets

FOREIGN PATENT DOCUMENTS

| | | |
|---|---|---|
| JP | 2004-364433 | 12/2004 |
| JP | 2005-039988 | 2/2005 |
| JP | 2005-295671 | 10/2005 |
| JP | 2006-516875 | 7/2006 |
| JP | 2006-230166 | 8/2006 |
| JP | 2008-283819 | 11/2008 |

* cited by examiner

FIG. 2A
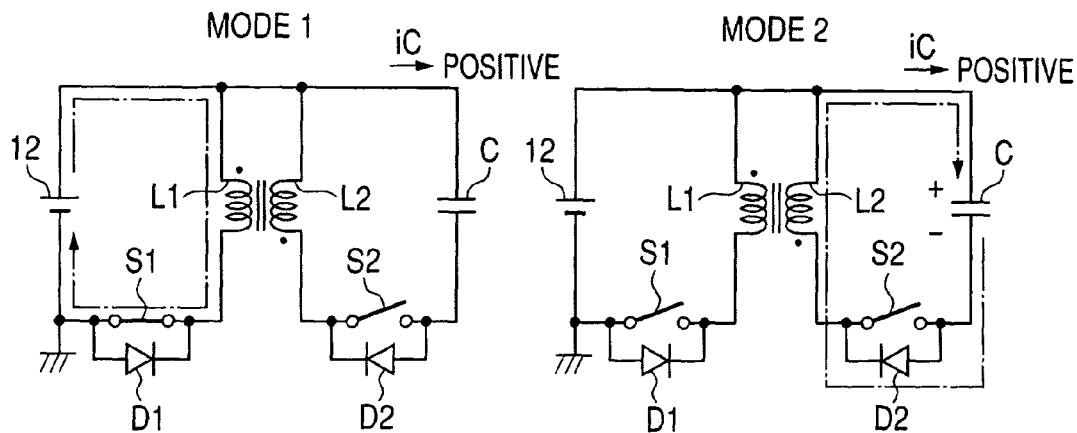
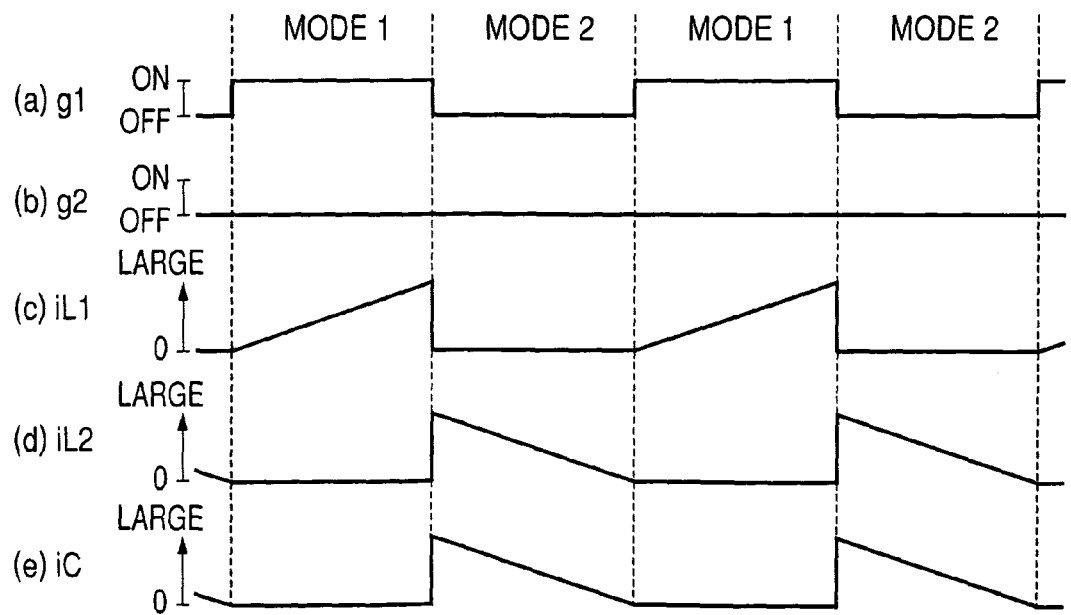
FIG. 2B $t1 = 2 \cdot L \cdot iCr \cdot (Vc + Vin)/(vin^2)$ $t2 = 2 \cdot L \cdot (-iCr) \cdot (Vc + Vin)/(vin \cdot Vc)$

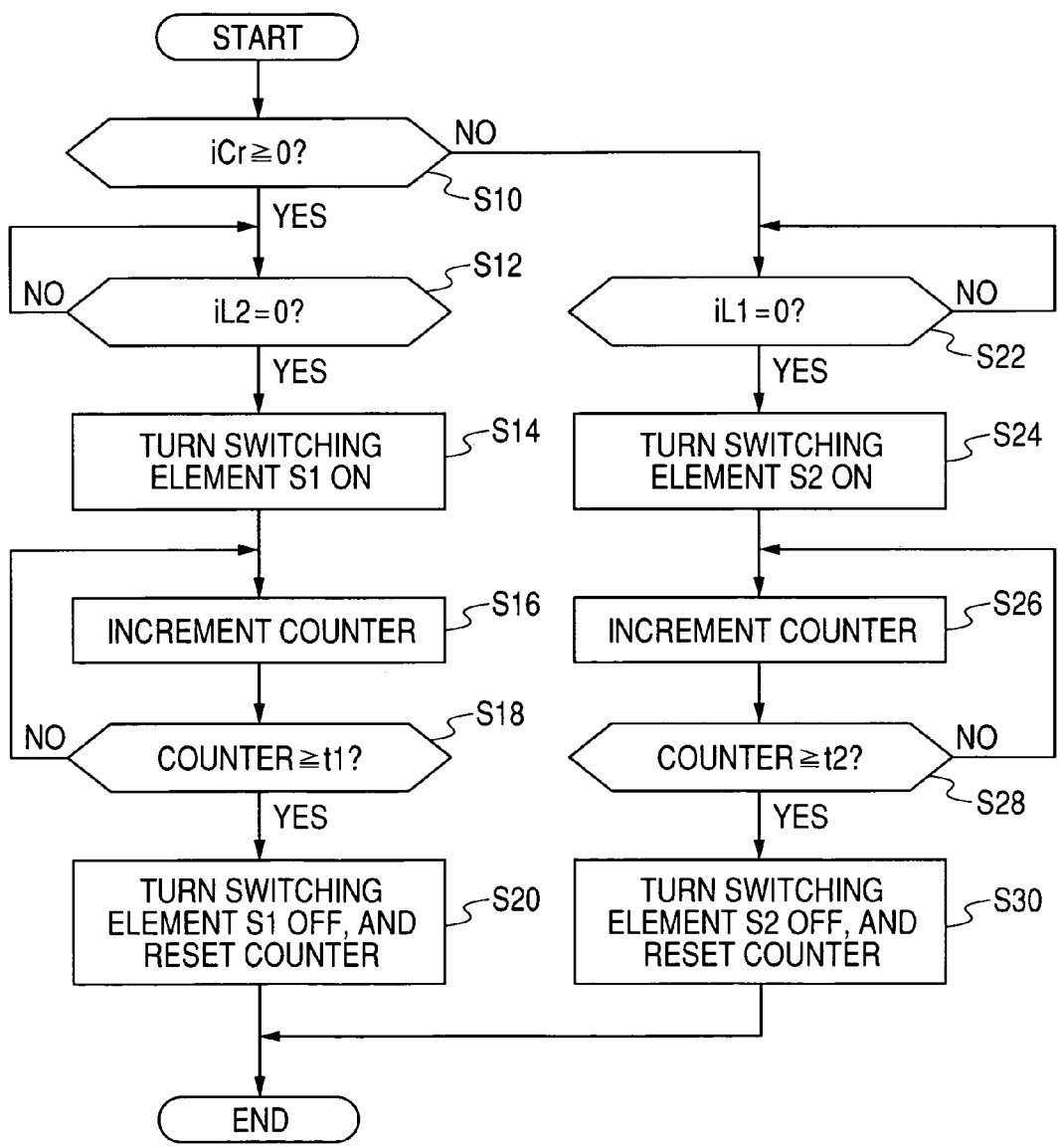

FIG. 10A
(iC < 0)
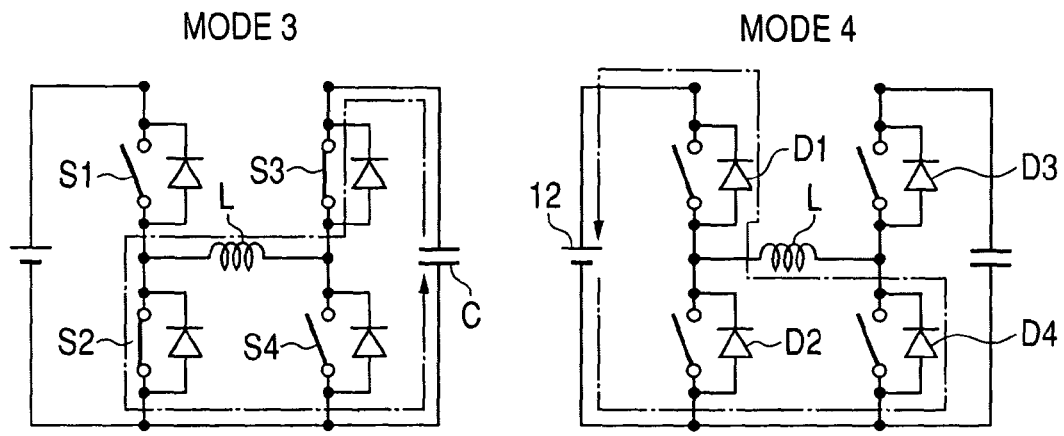
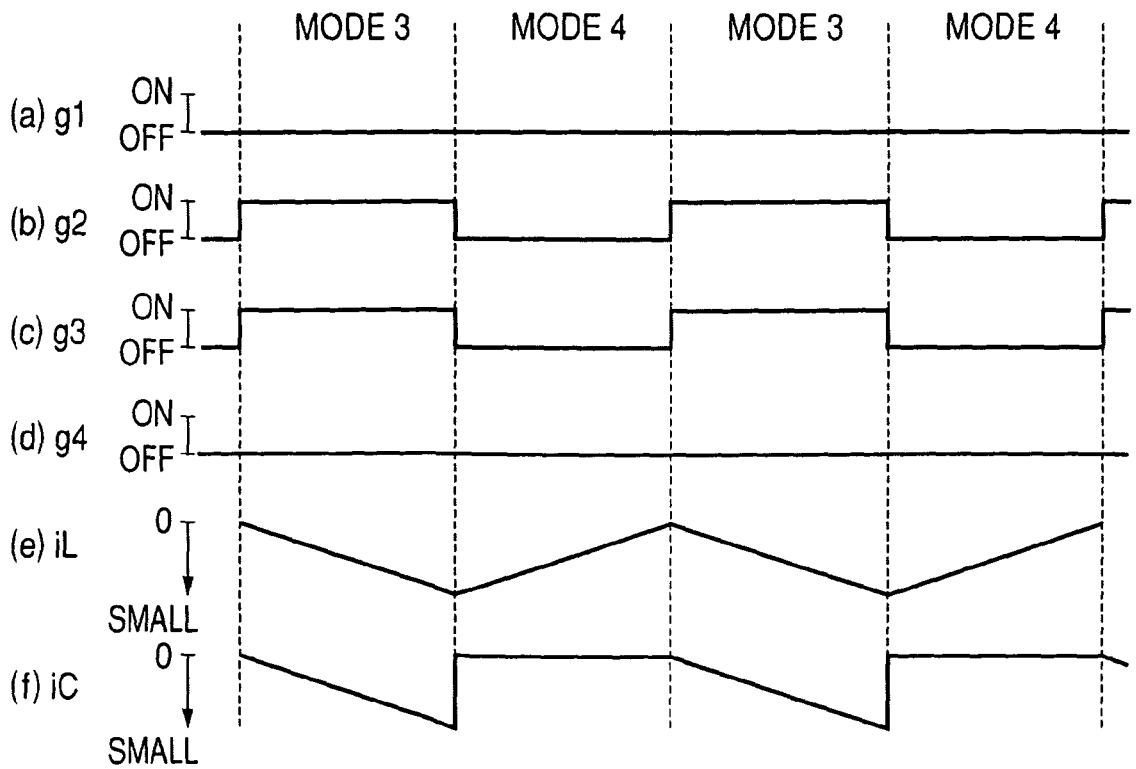
FIG. 10B

ELECTRIC POWER CONVERSION CIRCUIT, AND CONTROL DEVICE FOR MULTIPHASE ELECTRIC ROTARY MACHINE

CROSS-REFERENCE TO RELATED APPLICATION

This application is related to and claims priority from Japanese Patent Application No. 2008-193272 filed on Jul. 28, 2008, the contents of which are hereby incorporated by reference.

BACKGROUND OF THE INVENTION

1. Field of the Invention

The present invention relates to an electric power conversion circuit connected between an electric power supply source (such as a battery) and a multiphase electric rotary machine, and further relates to a control device for controlling the electric power conversion circuit to adjust control values for the multiphase electric rotary machine.

2. Description of the Related Art

It is known to control a switching element for an inverter unit based on a comparison result between an instruction voltage and a carrier wave to be supplied to an electric rotary machine as a control target. In the control operation, the inverter unit can supply an instruction voltage of an approximate sine curve to terminals of the electric rotary machine. However, because the output voltage of the inverter unit is varies rapidly when transmitted as binary, the voltage at a neutral node of the electric rotary machine is varied rapidly. This often generates common-mode noises and a large surge voltage.

In order to avoid the drawback of the control operation using the conventional inverter unit, for example, Japanese patent laid open publication JP 2005-295671 has proposed a conventional electric power conversion circuit in which the output terminal of each phase in a three phase electric rotary machine is connected to the output terminal of each of the converter unit. Each of the converter units in the conventional electric power conversion circuit converts the voltage of a capacitor connected in parallel to a pair of the output terminals of the electric rotary machine. The conventional electric power conversion circuit having the above structure suppresses the generation of a surge voltage because of supplying the voltage in a sine curve to each phase of the three-phase electric rotary machine.

By the way, each of the converter units in the conventional electric power conversion circuit for the three-phase electric rotary machine disclosed in JP 2005-295671 has four switching elements. That is, the conventional electric power conversion circuit for the three-phase electric rotary machine therefore has the twelve switching elements. The total number of the switching elements used in the conventional electric power conversion circuit disclosed in JP 2005-295671 is accordingly greater than that of the switching elements used in the previously-described inverter units. This increases the manufacturing cost of the electric power conversion circuit.

SUMMARY OF THE INVENTION

It is an object of the present invention to provide an electric power conversion circuit and a control device. The electric power conversion circuit is connected between an electric power supply source such as a high voltage battery and a multiphase electric rotary machine. The electric power conversion circuit according to the present invention is comprised of fewer components when compared with the conventional electric power conversion circuit. That is, the structure of the electric power conversion circuit according to the present invention suppresses the total number of the components. Further, the control device according to the present invention transfers control values to the electric power conversion circuit in order to control the operation of the multiphase electric rotary machine.

To achieve the above purposes, the present invention provides an electric power conversion circuit connected between an electric power supply means and a multiphase electric rotary machine. The electric power conversion circuit has a voltage conversion means placed for each of phases other than a predetermined phase of the multiphase electric rotary machine. The voltage conversion means converts a voltage of the electric power supply means to a predetermined voltage. The voltage conversion means supplies the predetermined voltage to the multiphase electric rotary machine. The predetermined phase of the multiphase electric rotary machine is connected to a node having a voltage potential within a variable voltage potential of the other phases by supplying the voltage converted by the voltage conversion means to the other phases of the multiphase electric rotary machine.

The voltage conversion means according to the present invention varies the voltage of the electric power supply means and then supplies the varied voltage to each of the phases other than the predetermined phase. This structure makes it possible to control a line voltage as a difference in voltage between the predetermined phase and each of the other phases. That is, it is possible to adjust the control values for the multiphase electric rotary machine to desired control values. In particular, because no voltage conversion means is placed for the predetermined phase of the multiphase electric rotary machine, it is possible to decrease the total number of components of the electric power conversion circuit, and also to decrease electric power loss for the predetermined phase. It is desirable to connect the predetermined phase to a node at a voltage potential of a positive electrode or a negative electrode of the electric power supply means, or a node at a voltage potential between the positive and negative electrodes of the electric power supply means.

BRIEF DESCRIPTION OF THE DRAWINGS

A preferred, non-limiting embodiment of the present invention will be described by way of example with reference to the accompanying drawings, in which:

FIG. 2A is a diagram showing a configuration of a chopper circuit part;

FIG. 2B is timing charts (a) to (e) showing current modes of the chopper circuit part in the EPC shown in FIG. 1;

FIG. 6 is a flow chart showing the chopper control for the chopper circuit part in the EPC shown in FIG. 1;

FIG. 10A is a diagram showing the configuration of the chopper circuit part;

FIG. 10B is timing charts (a) to (f) showing other current modes of the chopper circuit part in the EPC shown in FIG. 8;

DETAILED DESCRIPTION OF THE PREFERRED EMBODIMENTS

Figure 1:
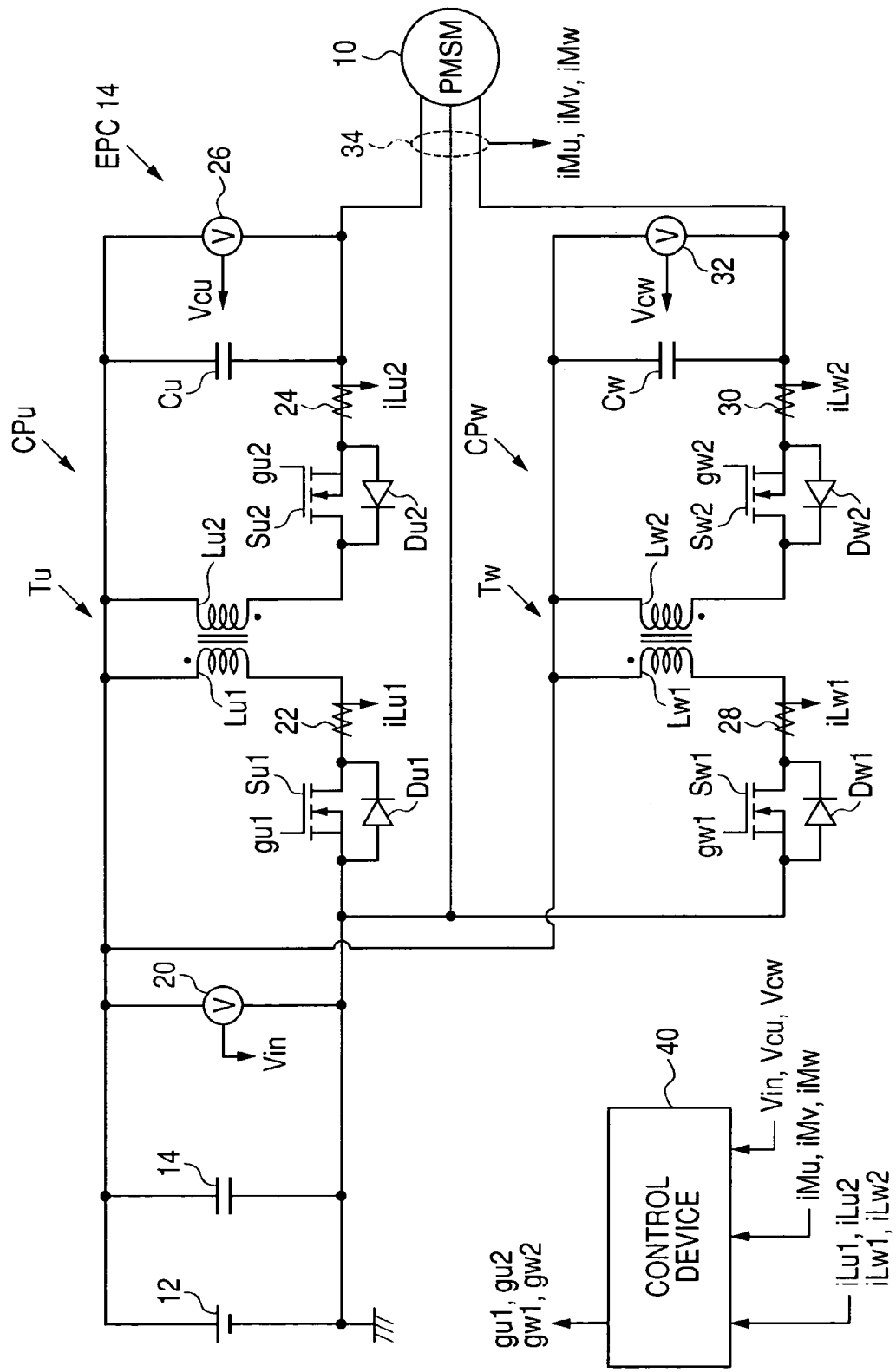
FIG. 1 is a diagram showing an entire configuration of a control system for controlling the operation of an electric rotary machine, and the control system is comprised of an electric power conversion circuit (EPC), a control device, and a high voltage battery according to the first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the control system equipped with the electric power conversion circuit (EPC) and the control device capable of controlling the operation of the EPC for the electric rotary machine 10 according to the first embodiment of the present invention with reference to FIG. 1 to FIG. 6.

FIG. 1 is a diagram showing an entire configuration of a control system for controlling the operation of the electric rotary machine 10. The control system is comprised of the electric power conversion circuit 14, the control device 40, and the high voltage battery 12. The electric power conversion circuit 14 is comprised of a U phase part and a W phase part.

For example, the electric rotary machine 10 is an electric power generator such as a permanent magnet synchronous motor (PMSM) for use in hybrid vehicles. The electric rotary machine 10 is connected to a high voltage battery 12 through the electric power conversion circuit (EPC) 14. The battery 12 is a rechargeable battery such as a nickel-metal hydride (NiMH) or a lithium-ion rechargeable battery.

The EPC 14 is equipped with a means for fixing the V phase of the electric rotary machine 10 at a negative voltage potential of the battery 12, and voltage converter means (as a U phase converter unit and a W phase converter unit) connected to each of the U phase and the W phase of the electric rotary machine 10. The EPC 14 is capable of continuously adjusting voltages applied to the U phase and the W phase of the electric rotary machine 10.

The EPC 14 according to the first embodiment is equipped with the U phase converter unit and the V phase converter unit. Each of the converter units is capable of increasing and decreasing the output voltage thereof. Each of the converter units is comprised of the chopper circuit parts CPu, CPw, and capacitors Cu, Cw. The control device 40 according to the first embodiment of the present invention controls the chopper operation of each of the chopper circuit parts CPu, CPw. The capacitances of the capacitors Cu and Cw are changeable according to the voltage of the battery 12.

In the following explanation, reference characters designating each of the U and W phases will be omitted when it is not necessary to distinguish the phases to each other. For example, the reference character "C" represents both the capacitor Cu and the capacitor Cw.

The chopper circuit part CP (CPu and CPw) is comprised of a transformer T in which a terminal at the starting side of a primary coil L1 and a terminal at the terminating side of a secondary coil L2 are connected together. In other words, the chopper circuit part CP has the transformer T in which one terminal of the primary coil L1 and the terminal of the secondary coil L2 make a short circuit, where the secondary coil L2 has the terminal at an inverted voltage potential of the mutually-inducted voltage to the voltage potential at the terminal of the primary coil L1. The number of turns is same between the primary coil L1 and the secondary coil L2.

The terminal at the terminating side of the primary coil 11 is connected to the negative electrode of the high voltage battery 12 through a switching element S1. The terminal of the secondary coil L2 (Lu2, Lw2) is connected to the capacitor C (Cu, Cw) through a switching element S2 (Su2, Sw2).

The switching element S1 opens and closes the loop circuit composed of the primary coil L1 and the capacitor C. The switching element S2 opens and closes the loop circuit composed of the secondary coil L2 and the capacitor C.

The transformer T (Tu, Tw) is placed in the chopper circuit part CP (CPu, CPw) so as to charge positive electric charge to one of the terminals of the capacitor C connected to the positive electrode terminal of the high voltage battery 12 through the transformer T. That is, a known reverse type buck boost converter equipped with a single coil, (instead of the transformer T in the above chopper circuit part C in each of the converter units), is a converter in which the inverted voltage of the voltage at the electrode of the battery becomes the voltage of the capacitor C. In order to avoid this and to decrease the total number of the switching elements, the first embodiment provides the chopper circuit part CP equipped with the transformer T and the converters. Each of the converters in the chopper circuit part CP can adjust the absolute value of the voltage of the capacitor C within a range of zero to not less than the absolute value of the voltage of the high voltage battery 12, like the known reverse type buck boost converter.

The chopper circuit part CP (CPu, CPw) is further equipped with a diode D1 (Du1, Dw1) and a diode D2 (Du2, Dw2). The diode D1 (Du1, Dw1) is connected in parallel to the switching element S1 (Su1, Sw1) in which the forward direction of the current is made from the negative electrode of the high voltage battery 12 to the terminal at the terminating side of the primary coil L1 (Lu1, Lw1).

The diode D2 (Du2, Dw2) is connected in parallel to the switching element S2 (Su2, Sw2) in which the forward direction of the current is made from the negative electrode of the capacitor C (Cu, Cw) to the terminal at the starting side of the secondary coil L2 (Lu2, Lw2).

In the first embodiment, each of the switching elements S1, S2 is composed of a power MOS FET as a body diode of MOS FET. It is also possible to use, as each of the diodes D1 and D2, a body diode of MOS FET such as a power MOS FET.

The terminal of the capacitor C, which is not connected to the positive electrode terminal of the high voltage battery 12, is connected to both the U phase and the W phase of the electric rotary machine 10. This makes it possible to adjust the voltage of each of the U phase and the W phase of the electric rotary machine 10 to a voltage within a range of a lower voltage of less than the voltage potential of the negative electrode of the battery 12 to the high voltage battery 12.

The control system having the above structure shown in FIG. 1 has following detection means, in order to detect the internal conditions thereof, such as voltage sensors 20, 26, and 32, and current sensors 22, 24, 28, 30, and 34.

The voltage sensor 20 detects the voltage of the high voltage battery 12. In the U phase part (as the U phase converter unit) of the EPC 14, the current sensor 22 detects the current iLu1 flowing in the primary coil Lu1. The current sensor 24 detects the current iLu2 flowing in the secondary coil Lu2. The voltage sensor 26 detects the voltage of the capacitor Cu.

In the W phase part (as the W phase converter unit) of the EPC 14, the current sensor 28 detects the current iLw1 flowing in the primary coil Lw1. The current sensor 30 detects the current iLw2 flowing in the secondary coil Lw2. The voltage sensor 32 detects the voltage of the capacitor Cw.

The current sensor 34 detects the current of each of the U, V, and W phases of the electric rotary machine 10.

On the other hand, the control device 40 in the control system shown in FIG. 1 is a device to control the operation of the electric rotary machine 10 through the EPC 14. The control device 40 inputs the detection signals transferred from the above current sensors and the voltage sensors, and controls the operation of the electric rotary machine 10 based on the detection signals through the EPC 14.

In detail, the control device 40 generates instruction signals (or operation signals) gu1, gu2 to operate the switching elements Su1, Su2, instruction signals (operation signals) gw1, gw2 to operate the switching elements Sw1, Sw2 based on the detection signals. That is, the control device 40 performs the chopper control for the chopper circuit parts in the U phase converter circuit and the W phase converter unit of the EPC 14 in order to adjust the voltage of the high voltage battery 12 to a desired voltage. The obtained voltage becomes the voltage of the capacitors Cu and Cw. This control makes it possible to adjust the voltage of the U phase and the W phase of the electric rotary machine 10 within a range of two times of the voltage Vin of the high voltage battery 12 up to the positive voltage of the high voltage battery 12 as the upper limit voltage.

The bottom voltage of the U phase and W phase of the electric rotary machine 10 is not determined based on the structure of the converter units in the EPC 14. That is, the lowest limit value of the voltage potential of the U phase and W phase of the electric rotary machine 10 is determined based on a line voltage Vuv as a difference in voltage between the U phase voltage and the W phase, or a line voltage Vvw as a difference in voltage between the V phase and the W phase, and based on the condition to make the absolute values of both the line voltages Vuw and Vvw to be equal.

FIG. 2A is a diagram showing a configuration of the chopper circuit part CP and FIG. 2B is timing charts (a) to (e) showing current modes 1 and 2 of the chopper circuit part CP in the EPC 14 shown in FIG. 1. Thus, FIG. 2A shows the chopper control when a positive output current iC (iC>0) of the chopper circuit part CP (CPu, CPw) flows to the capacitor C (Cu, Cw) and the electric rotary machine 10. FIG. 2A also shows one of the converter units that form the EPC 14. In the following explanation, it is assumed for brevity that the amount of electric charge transmitted between the capacitor C and the electric rotary machine 10 is extremely small, which can be neglected.

FIG. 2A shows the chopper control of the chopper circuit part CP when iC>0. The timing chart (a) in FIG. 2B shows the transition of the instruction signal (operation signal) g1 of the switching element S1. The timing chart (b) in FIG. 2B shows the transition of the instruction signal (operation signal) g2 of the switching element S2. The timing chart (c) in FIG. 2B shows the transition of the current iL1 flowing in the primary coil L1. The timing chart (d) in FIG. 2B shows the transition of the current iL2 flowing in the secondary coil L2. The timing chart (e) in FIG. 2B shows the transition of the output current iC of the chopper circuit part CP.

As shown in FIG. 2A, when the switching element S1 is turned on (current mode 1), the loop current flows in a loop circuit comprised of the high voltage battery 12, the primary coil L1, and the switching element S1. The loop current charges the energy into the primary coil L1. In this situation, when the switching element S2 is turned off, the reversed voltage is applied into the diode D2, and no current flows in the secondary coil L2 (see current mode 1 shown in FIGS. 2A-B).

Next, when the switching element S1 is turned off (current mode 2), the positive voltage is applied to the terminal of the capacitor C connected to the positive electrode of the high voltage battery 12 (see current mode 2 shown in FIG. 2). The current mode 2 makes it possible to charge the capacitor C because the current flows in the loop circuit comprised of the secondary coil L2, the capacitor C, and the diode D2.

Figure 3A:
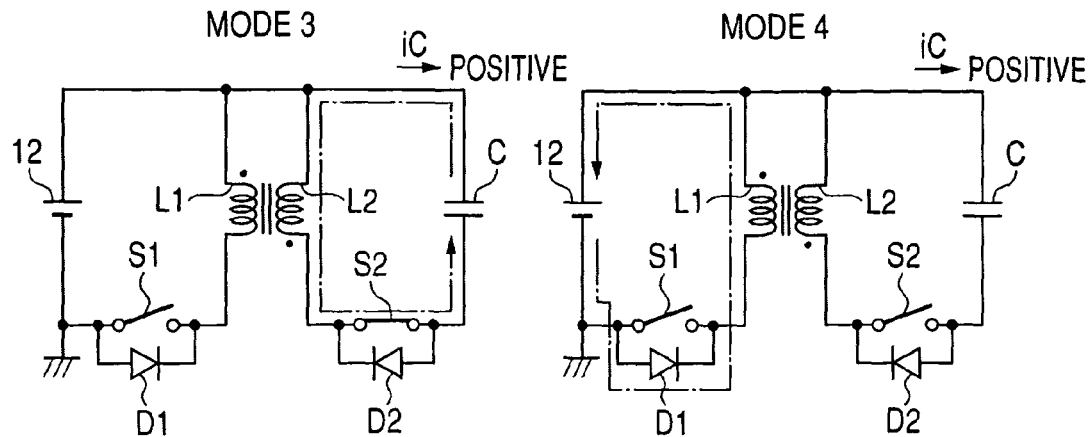
FIG. 3A is a diagram showing a configuration of the chopper circuit part.
Figure 3B:
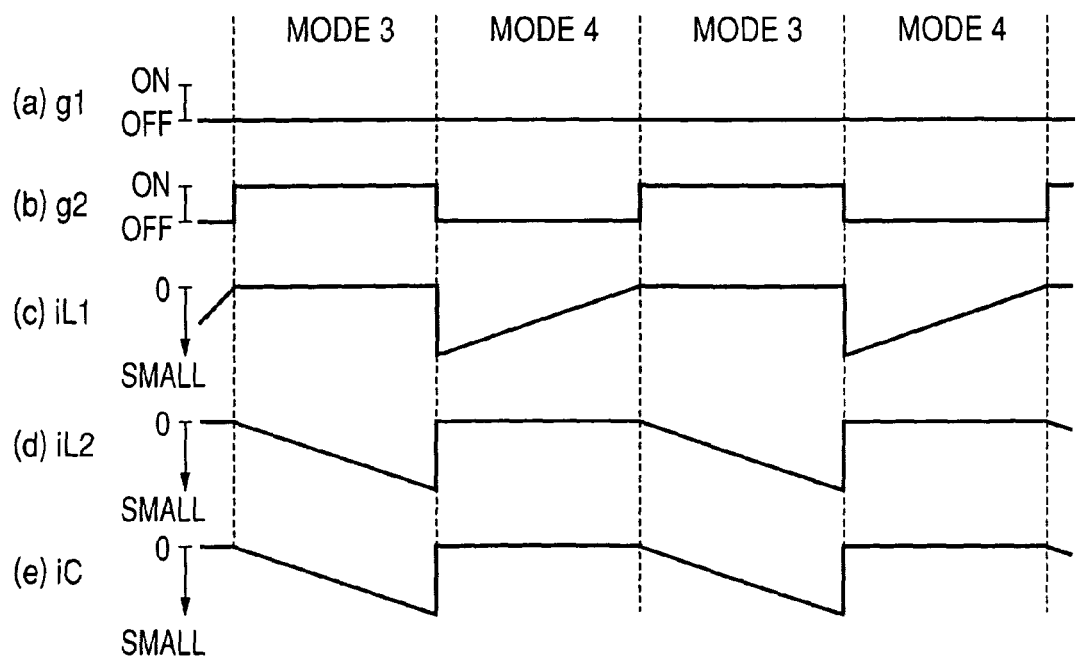
FIG. 3B is timing charts (a) to (e) showing other control modes of the chopper circuit part in the EPC shown in FIG. 1.

FIG. 3A is a diagram showing a configuration of the chopper circuit part and FIG. 3B is a timing chart showing current modes 3 and 4 of the chopper circuit part in the EPC shown in FIG. 1.

FIG. 3A shows the chopper control when a negative output current iC (iC<0) of the chopper circuit part CP (CPu, CPw) flows to the capacitor C (Cu, Cw) and the electric rotary machine 10. FIG. 3A shows one of the converter units in the EPC 14. In the following explanation, because the amount of electric charge transmitted between the capacitor C and the electric rotary machine 10 is extremely small, it can be neglected.

FIG. 3A shows the chopper control of the chopper circuit part CP. The timing charts (a) to (e) shown in FIG. 3B correspond to the timing charts (a) to (e) shown in FIG. 2B, respectively.

As shown in FIG. 3A, the switching element S2 is turned on (current mode 3), the loop current flows in a loop circuit comprised of the capacitor C, the secondary coil L2, and the switching element S2. The loop current charges the energy into the secondary coil L2. In this situation, when the switching element S1 is turned off, the reversed voltage is applied into the diode D1, and no current flows in the primary coil L1 (see current mode 3 shown in FIGS. 3A-B).

Next, when the switching element S2 is turned off (current mode 4), the reversed voltage is generated in the primary coil L1 in which the positive electrode of the high voltage battery 12 is positive. The current mode 4 makes it possible for the loop current to flow in the loop circuit comprised of the primary coil L1, the capacitor C, and the diode D1.

As described above, it is possible to apply the voltage of an analogue value to the electric rotary machine 10 by adjusting the voltage which is converted from the voltage of the high voltage battery 12 as the direct current electric power source, in other words, by adjusting the voltage of the capacitor C. In an actual case, the voltage change of the capacitor C correctly corresponds to the sign of the output current of the chopper circuit part CP in one to one corresponding because of transmitting (inputting and outputting) electrical charge between the capacitor C and the electric rotary machine 10. However, the control system equipped with the control device 40, the EPC 14, the high voltage battery 12 according to the first embodiment of the present invention can correctly adjust the voltage of the capacitor C based on the instruction signals (operation signals) gu1, gu2, gw1, and gw2.

Figure 4:
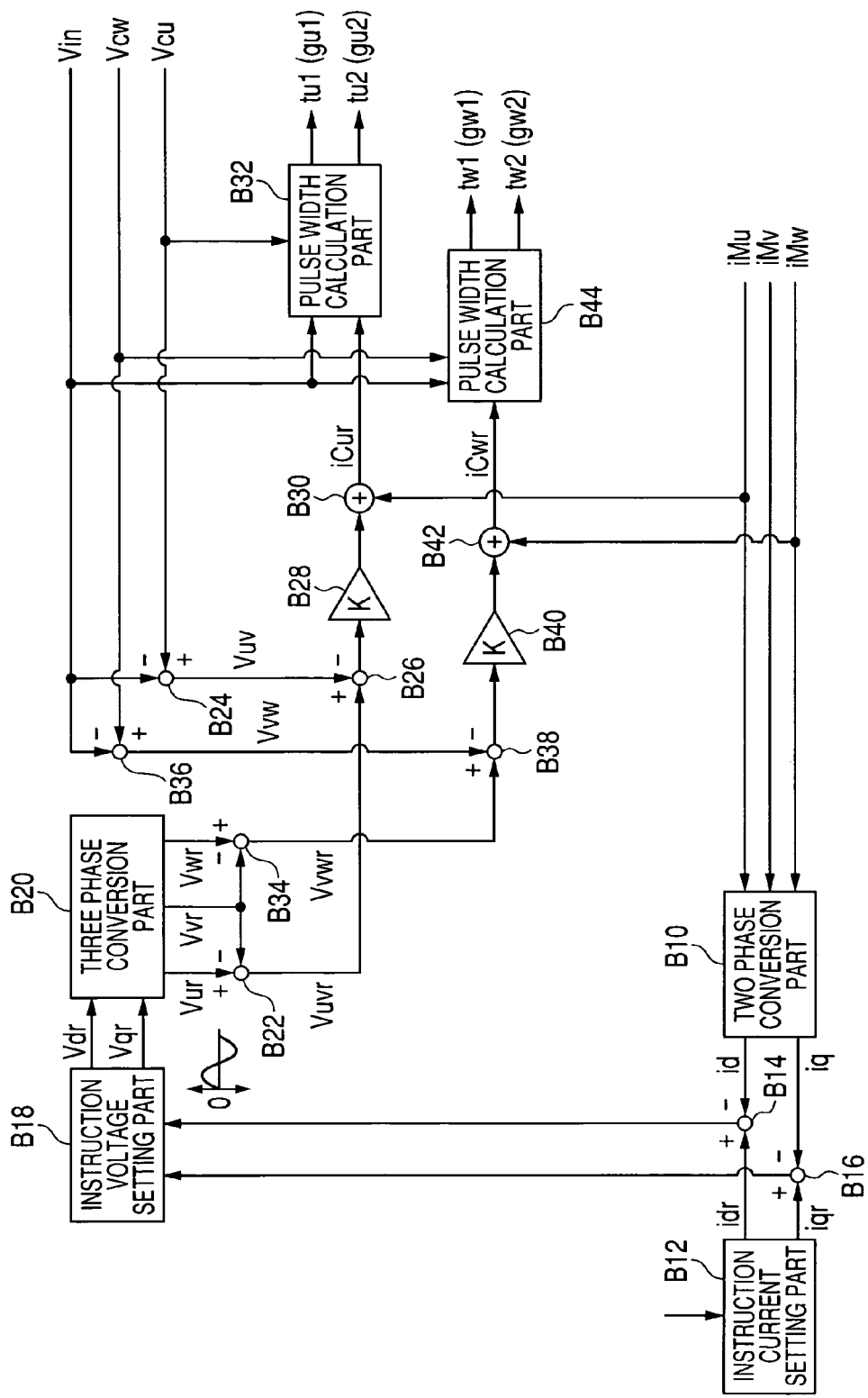
FIG. 4 is a diagram showing a schematic configuration of the control device capable of generating instruction signals for use in the chopper control of the chopper circuit part in the EPC shown in FIG. 1.

FIG. 4 is a diagram showing a schematic configuration of the control device 40 in the control system shown in FIG. 1. The control device 40—generates the instruction signals (operation signals) gu1, gu2, gw1, and gw2 which are used for performing the chopper control of the chopper circuit part CP (CPu, CPw) in the EPC 14 shown in FIG. 1.

As shown in FIG. 4, the control device 40 is comprised of a two phase conversion part B10, an instruction current setting part B12, a difference value calculation part B14, a difference value calculation part B16, an instruction voltage setting part B18, a three phase conversion part B20, a line instruction voltage calculation part B22, a line voltage calculation part B24, a difference calculation part B26, a feedback control part B28, a feed forward adjusting part B30, a pulse width calculation part B32, a line instruction voltage calculation part B34, a line voltage calculation part B36, a difference calculation part B38, a feedback control part B40, a feed forward adjusting part B42, and a pulse width calculation part B44.

The two phase conversion part B10 inputs the currents iMu, iMv, and iMw of the U, V, and W phases of the electric rotary machine 10. The two phase conversion part B10 converts the currents iMu, iMv, and iMw into a real current id on the d axis and a real current iq on the q axis as currents in a two-phase rotating coordinate system.

On the other hand, the instruction current setting part B12 sets the instruction current idr on the d axis and the instruction current iqr on the q axis based on a request torque. The difference value calculation part B14 calculates a difference between the real current id and the instruction current idr. The difference value calculation part B16 calculates a difference between the real current iq and the instruction current iqr. The instruction voltage setting part B18 sets the instruction voltage vdr on the d axis and the instruction voltage vqr on the q axis based on the output values from the difference value calculation part B14 and the difference value calculation part B16. In the first embodiment, the instruction voltage setting part B18 sets the instruction voltage vdr on the d axis as the instruction signal (operation signal) to perform the feedback control of the real current id to the instruction current idr. The instruction voltage setting part B18 further sets the instruction voltage vqr on the q axis as the instruction signal (operation signal) to perform the feedback control of the real current iq to the instruction current iqr. The feedback control is a proportional integral derivative (PID) control, for example.

The three phase conversion part B20 converts the instruction voltages vdr on d axis and the instruction voltage on q axis into instruction phase voltages Vur, Vvr, Vwr of a three phase. The instruction phase voltages Vur, Vvr, Vwr are signals of a triangle wave all shifted together by $2\pi/3$.

The line instruction voltage calculation part B22 calculates a line instruction voltage Vuvr as a difference between the instruction phase voltage Vvr and the instruction phase voltage Vur.

On the other hand, the line voltage calculation part B24 calculates a real line voltage Vuv as a difference between the input voltage Vin as the voltage of the high voltage battery 12 and the voltage Vcu of the capacitor Cu. The difference calculation part B26 calculates a difference between the real line voltage Vuv and the instruction line voltage Vuvr. The feedback control part B28 inputs the output as the calculation result of the difference calculation part B26. In the first embodiment, PID control is performed. In PID control, a proportional gain K is set based on the capacitor Cu and a request variable speed of the voltage of the capacitor Cu. The feed forward adjusting part B30 inputs the output of the feedback control part B28. The feed forward adjusting part B30 adds the U phase current iMu into the output of the feedback control part B28 in order to obtain the instruction value (output current instruction value iCur) of the output current of the chopper circuit part CPu. The output current instruction value ICur is an instruction value corresponding to a sum of the current supplied to the capacitor Cu and the current supplied to the electric rotary machine 10.

The pulse width calculation part B32 calculates the instruction signals (operation signals) gu1, gu2 so that the output current becomes the output current instruction value iCur based on the output current instruction value iCur, the voltage Vin of the high voltage battery 12 detected by the voltage sensor 20, and the voltage Vcu of the capacitor Cu.

Similarly, the line instruction voltage calculation part B34 calculates the instruction line voltage Vvwr as the difference between the instruction phase voltage Vvr and the instruction phase voltage Vwr. On the other hand, the line voltage calculation part B36 calculates the real line voltage Vvw as the difference between the input voltage Vin and the voltage Vcw of the capacitor Cw. The difference calculation part B38 calculates the difference between the real line voltage Vvw and the instruction line voltage Vvwr. The feedback control part B40 inputs the output of the difference calculation part B38. The feedback control part B40 performs the PID control.

The feed forward adjusting part B42 receives the output of the feedback control part B40. The feed forward adjusting part B42 calculates the instruction value (output current instruction value iCwr) for the output current of the chopper circuit part Cpw by adding the W phase current iMw into the output of the feedback control part B40. The pulse width calculation part B44 calculates the instruction signals based on the output current instruction value iCwr, the input voltage Vin, the voltage Vcw of the capacitor Cw so that the output current becomes the output current instruction value iCur.

Next, a description will now be given of the processes of the pulse width calculation part B32 and the pulse width calculation part B44 with reference to FIG. 5A and FIG. 5B.

Figure 5A:
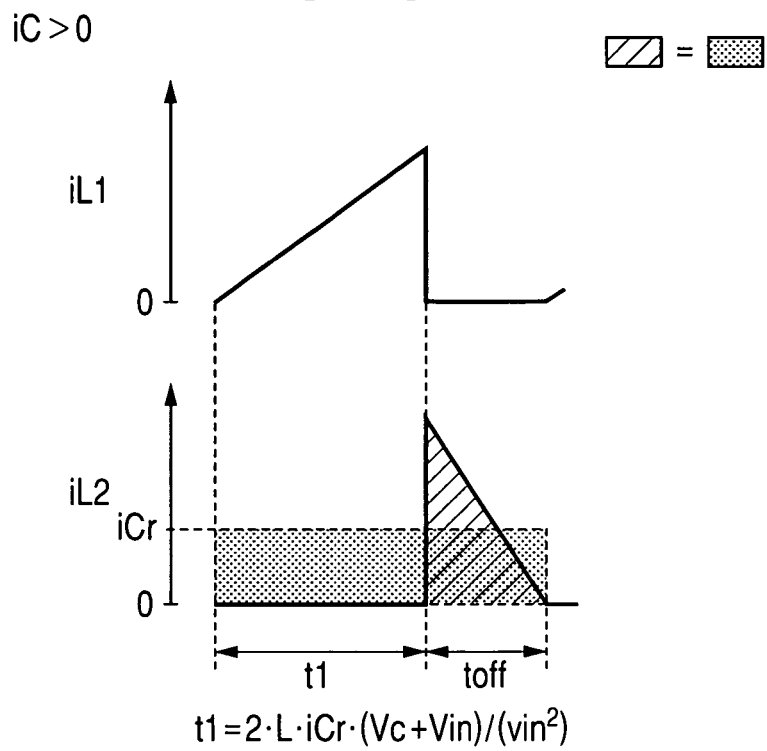
FIG. 5A is a diagram showing currents flowing through the coils of a transformer in the chopper circuit part in the EPC shown in FIG. 1 when the output current of the capacitor is positive.

FIG. 5A is a diagram showing the currents flowing through the primary and secondary coils L1, L2 (Lu1, Lw1, Lu2, Lw2) of the transformer in the copper circuit part (CPu, CPw) in the EPC 14 shown in FIG. 1 when the output current of the capacitor C (Cu, Cw) is positive. FIG. 5B is a diagram showing the currents flowing through the primary and secondary coils L1, L2 (Lu1, Lw1, Lu2, Lw2) of the transformer when the output current of the capacitor C (Cu, Cw) is negative.

The ON time t1 shown in FIG. 5A indicates the ON time of the switching element S1. As shown in FIG. 5A, the switching element S1 is turned on, the current flows as expressed in current mode 1 shown in FIG. 2A, and the current flowing through the primary coil L1 is gradually (little by little) increased. Because the switching element S1 is turned off when the ON time t1 has been elapsed, the current in current mode 2 shown in FIG. 2 flows, and the current increased in step thereby gradually flows in the secondary coil L2. In the first embodiment, when the current flowing through the secondary coil 12 becomes zero, the switching element S1 is returned to the on-state again.

The current flows in the capacitor C and the electric rotary machine 10 and this current gradually decreases only during the off state of the switching element S1.

In a microscopic time scale, it is impossible to control this current by the output current instruction value iCr. In the first embodiment, a mean value of the current flowing through the capacitor C and the electric rotary machine 10 during a predetermined period of time is set as the output current instruction value iCr. The predetermined period of time is set as a period of on-off operation for the switching element S1.

In the condition "iC>0" as shown in FIG. 5A, the shadowed area (designated by slant lines) represents the amount of electric charge supplied to the capacitor C and the electric rotary machine 10.

When this shadowed area becomes equal to the integral value of the output current instruction value iCr during the on-off period of time of the switching element S1, it is possible to use, as the output current instruction value iCr, the mean value of the real output current to the capacitor C and the electric rotary machine 10 during one period of time. This can be obtained by setting the ON time t1 as follows. The On time t1 represents the period of time during the turned-on of the switching element S1.

The peak current Ip flowing in the primary coil L1 can be expressed by the following formula (c1), which is gradually increased and decreased repeatedly.

$$Vin = L \cdot Ip/t1 \quad (c1),$$

where L designates an inductance of the primary coil L1, t1 denotes the ON time, and Vin indicates the voltage of the high voltage battery 12.

In addition, the peak current Ip can be expressed by the following formula (c2).

$$Vc = L \cdot Ip/t_{off} \quad (c2),$$

where Vc designates the voltage of the capacitor C, and L denotes the inductance of the secondary coil L2 (=the inductance of the primary coil L1).

The relationship between the ON time $t_{up}$ and the OFF time $t_{off}$ can be expressed based on the formulas (c1), (c2) by the following formula (c3).

$$Vin/Vc = t_{off}/t1 \quad (c3).$$

The mean value of the electric power to be supplied to the capacitor C and the electric rotary machine 10 during the predetermined period of time can be expressed by the following formula (c4).

$$Ip \cdot t_{off}/\{2 \cdot (t1+t_{off})\} = t1 \cdot Vin \cdot Vin/2 \cdot L \cdot (Vin+Vc) \quad (c4)$$

When the mean value expressed by the formula (c4) is equal to the output current instruction value iCr, the following formula (c5) can be obtained.

$$t1 = 2 \cdot L \cdot iCr \cdot (Vin+Vc)/(Vin \cdot Vin) \quad (c5).$$

Figure 5B:
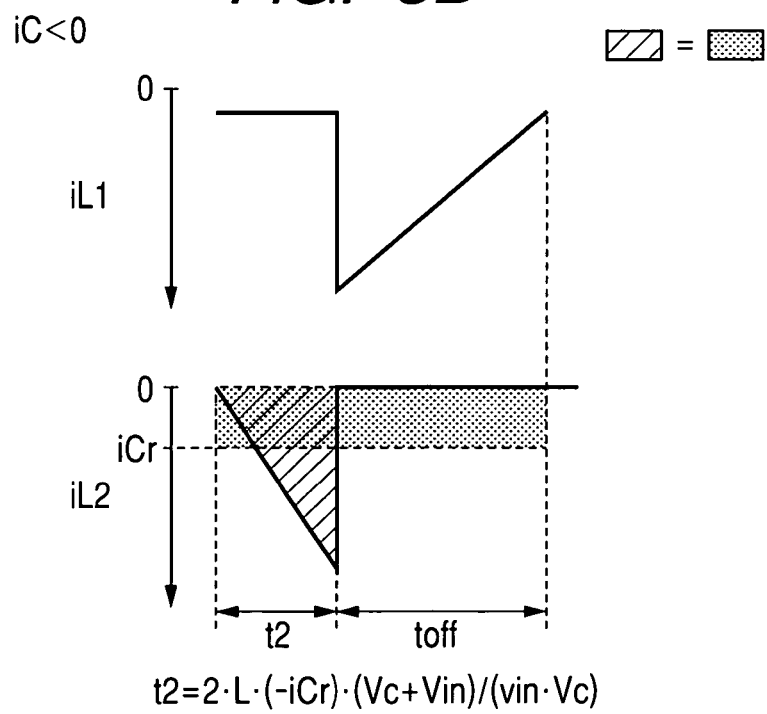
FIG. 5B is a diagram showing currents flowing through the coils of the transformer in the chopper circuit part when the output current of the capacitor is negative.

On the other hand, FIG. 5B shows the current flowing in the primary coil L1 and the secondary coil L2 when the output current iC is negative.

The ON time t2 shown in FIG. 5B indicates the ON time of the switching element S2. As shown in FIG. 5B, when the switching element S2 is turned on, the current in current mode 3 shown in FIG. 3 flows, and the absolute value of the current flowing in the secondary battery L2 is gradually increased.

Because the direction of the current flowing in the capacitor C toward the positive electrode of the high voltage battery 12 is positive, the current of less than zero is gradually decreased in the condition "iC<0" shown in FIG. 5B. Because the switching element S2 is turned off when the ON time t2 is elapsed, the current during the current mode 4 indicated by the timing chart (d) shown in FIG. 3 flows, and the absolute value of the current flowing in the primary coil L1 is increased in step, and then gradually decreased.

In the first embodiment, when the current flowing in the primary coil L1 becomes zero, the switching element S2 is turned on again.

In order to set as the output current instruction value iCr the mean value, during the predetermined period of time, of the output current to the capacitor C and the electric rotary machine 10, it is so controlled that the amount of the electric charge (the area designated by the slant lines), which is discharged from the capacitor C and the electric rotary machine 10 at the ON time t2 is equal to the integral value of the output current instruction value iCr during one period of the on-off of the switching element S2. This can be achieved by setting the ON time t2 by the following formula (c6).

$$t2 = 2 \cdot L \cdot (-iCr) \cdot (Vin+Vc)/(Vin \cdot Vc) \quad (c6).$$

Because the direction of the current flowing into the capacitor C and the electric rotary machine 10 is positive, the ON time t2 has a positive value by applying the output current instruction value iCr with the value of "−1".

As can be understood from the formulas (c5) and (c6), substituting the voltages Vin and Vc into the formulas (c5) and (c6) makes it possible to calculate the ON time t1 and the ON time t2. Using either the ON time t1 or the ON time t2 is determined by the sign of the output current instruction value iCr.

FIG. 6 is a flow chart showing the chopper control for the chopper circuit part Cp (CPu, CPw) in the EPC shown in FIG. 1.

The control device 40 repeatedly performs the chopper control composed of the series of processes shown in FIG. 6.

In step S10 shown in FIG. 6, it is detected whether or not the output current instruction value iCr is not less than zero (iCr≧0). This detection process in step S10 decides that either the switching element S1 or the switching element S2 performs the copper control.

When the detection result in step S10 indicates affirmation (iCr≧0) ("YES" in step S10), the operation flow forwards to step S12. In step S12, it is detected whether or not the current iL2 flowing in the secondary coil 12 is zero. This detection process in step S12 is performed to know the timing to switch the switching element S1 of OFF state to ON state.

When the detection result in step S12 indicates that the current iL2 flowing in the secondary coil L2 is zero ("YES" in step S12), the operation flow forwards to step S14 because it is the timing to switch to ON state of the switching element S1. In step S14, the switching element S1 is turned on.

In step S16, the counter to count the time during ON state of the switching element S1 is incremented. This incrementing process is continuously repeated until the value of the counter is not less than the ON time t1.

When the value of the counter is not less than the ON time t1 ("YES" in step S18), the operation flow forwards to step S20. In step S20, the switching element S1 is turned off, and the counter is reset.

On the other hand, when the detection result in step S10 indicates affirmation (iCr<0) ("NO" in step S10), the operation flow forwards to step S22.

In step S22, it is detected whether or not the current flowing in the primary coil L1 is zero. The process in step S22 is performed to know the timing to switch the switching element S2 of OFF state to ON state.

When the detection result in step S22 indicates that the current iL1 flowing in the primary coil L1 is zero ("YES" in step S22), the operation flow forwards to step S24 because it is the timing to switch to ON state of the switching element S2. In step S24, the switching element S2 is turned on.

In step S26, the counter is incremented, which counts the time during ON state of the switching element S2. This incrementing process is continuously repeated until the value of the counter is not less than the ON time t2 (step S28).

When the value of the counter is not less than the ON time t2 ("YES" in step S28), the operation flow forwards to step S30. In step S30, the switching element S2 is turned off, and the counter is reset.

As described above in detail, the control system equipped with the EPC 14, and the control device 40 according to the first embodiment of the present invention has the following effects.

(1) The converter units are provided for the U phase and the W phase, but not for the V phase in the three phase electric rotary machine 10. That is, the converter unit is connected to each of the U phase and the W phase in the three phase electric rotary machine 10, and not connected to the V phase. The converter unit converts the voltage of the high voltage battery 12 to a predetermined voltage level. The V phase is connected to a node of a voltage potential between the voltage of the U phase and the voltage of the W phase which are obtained by the voltage supplied from the converter units.

This structure makes it possible to set each of the line voltages Vuv, Vvw to a desired voltage level by controlling the voltages to be applied to the U phase and the W phase by the converter units in the EPC 14, where the line voltage Vuv is the voltage difference between the V phase and the U phase, and the line voltage Vvw is the voltage difference between the V phase and the W phase. This also makes it possible to set the output torque of the electric rotary machine 10, as the target value to be controlled, to a desired value. Further, because the V phase is not equipped with any converter unit, it is possible to decrease the total number of components in the control system for the electric rotary machine 10, and to decrease the total electric power loss of the control system.

(2) The voltage potential at one of the pair of the output terminals of the converter unit (namely, also one of the terminals of the capacitor C) is fixed to the voltage potential at one (the positive electrode) of the pair of the electrodes of the high voltage battery 12. That is, the voltage potential at one of the output terminals of the converter unit is connected to one of a pair of electrodes of the high voltage battery 12. The other terminal of the converter unit outputs an adjusted voltage, a polarity of which is same as that of the other electrode of the high voltage battery 12. The adjustable range of the voltage at the other terminal of the converter unit is larger than that of the voltage between the pair of the electrodes of the high voltage battery 12. This makes it possible to have the maximum value of the line voltage which is more than a half (½ times) of the voltage of the high voltage battery 12.

(3) When the energy supplied into the coils of the transformer from the high voltage battery 12 is output to the capacitor C, each of the converter units is equipped with the connection means to electrically connect the coil to the capacitor C in order to charge the output terminal of the converter unit (namely, the output terminal of the capacitor C) connected to the positive electrode of the high voltage battery 12 by positive electric charge. This makes it possible to adjust the line voltages, as the voltage potential differences between the V phase and the U phase and between the V phase and the W phase, to the positive or negative levels by setting the voltage of the V phase to the voltage potential of the positive electrode of the high voltage battery 12.

(4) The EPC 14 is equipped with the pair of the converter units CPu and CPw. Each of the converter units has the transformer T (Tu, Tw), the switching element S1 (Su1, Sw1), and the switching element S2 (Su2, Sw2). In the transformer T (Tu, Tw), a short circuit is made between one of the terminals of the primary coil L1 and one of the terminals of the secondary coil L2 whose voltage is mutually induced and has a reversed polarity to the terminal of the primary coil L1. The switching element S1 opens and closes the loop circuit composed of the primary coil L1 and the capacitor C. The switching element S2 opens and closes the loop circuit composed of the secondary coil L2 and the capacitor C. The structure makes it possible to adjust the voltage potential at one electrode of the capacitor C within the range from the voltage at one electrode (positive electrode) to the other electrode (negative electrode) of the high voltage battery 12.

(5) Each of the converter units further has the diode D1 (Du1, Dw1) and diode D2 (Du2, Dw2). When the switching element S1 is turned off, the current flows in the loop circuit composed of the secondary coil L2 and the capacitor C. When the switching element S2 is turned off, the current flows in the loop circuit composed of the secondary coil L1 and the capacitor C. Turning off the switching element S1, current can flow in the secondary coil L2 through the diode D2 without any turning on the switching element S1. Similarly, turning off the switching element S2 can flow the current in the primary coil L1 through the diode D1 without any turning on the switching element S2.

(6) In the converter unit in the EPC 14 according to the first embodiment, the V phase of the electric rotary machine 10 is connected to the negative electrode of the high voltage battery 12. This can obtain the maximum voltage range of the line voltages between the U, V, and W phases of the electric rotary machine 10.

(7) The electric power conversion circuit controls that the line voltage as a difference in voltage between the two phases (such as the U phase and the V phase) in the U, V, and W phases of the electric rotary machine 10 becomes equal to the instruction line voltage. This can control the torque of the electric rotary machine 10 to a desired value.

(8) The instruction phase voltages Vur, Vvr, Vwr are set, and the instruction line voltages Vuvr, Vvwr are calculated based on the instruction phase voltages Vur, Vvr, Vwr. This makes it possible to set the instruction phase voltage as to control the output torque of the electric rotary machine 10. It is thereby possible to, for example, use a program of a known logic in order to set the instruction phase voltage of each phase of the electric rotary machine 10.

(9) The instruction value iCr of the output current (or the output current instruction value iCr) of the chopper circuit unit CP (CPu, CPw) is calculated based on the instruction line voltages Vuvr, Vvwr. The chopper control for the chopper circuit unit is performed based on the output current instruction value iCr. This makes it possible to handle the output current that is requested for controlling the voltage of the capacitor C based on the instruction line voltages Vuvr, Vvwr. It is thereby possible to effectively control the voltage of the capacitor C according to the instruction line voltages Vuvr, Vvwr.

(10) The output current instruction value iCr is calculated in consideration of the current flowing through the terminal of the electric rotary machine 10 connected to the capacitor C. The feed forward control can eliminate the fluctuation caused by the currents flowing in the U, V, and W phases when the voltage of the capacitor C is controlled according to the instruction line voltages.

(11) The output current instruction value iCr is calculated based on the difference between the real line voltages Vuv, Vvw, and the instruction line voltages Vuvr, Vvwr. It is thereby possible to simply and effectively perform the control process of the voltage of the capacitor C based on the instruction line voltage.

(12) During one period of the on-off operation of the switching elements for the chopper control, the switching elements can be operated so that the mean value of the output current iC of the chopper circuit unit CP becomes equal to the output current instruction value iCr. This makes it possible to adjust the output current iC to the output current instruction value iCr within an extremely short period of time, and possible to effectively control the voltage of the capacitor C according to the instruction line voltage.

(13) The ON-time of the switching element for use in the chopper control is a variable value and switched from OFF state to ON state by setting to zero the amount of current flowing in the coils (the primary coil 11 and the secondary coil L2) in the transformer T (Tu, Tw) in the chopper circuit unit CP (CPu, CPw). This makes it possible to simply calculate the current flowing in the coils during the on-off period of the switching elements and the current flowing in the capacitor C (Cu, Cw). Further, because the switching element of the off-state is switched to the on-state by setting the current flowing in the coil to zero, it is possible to decrease the switching loss caused during this switching operation.

(14) On performing the chopper control, the voltage of the capacitor C and the voltage Vin of the high voltage battery 12 are used. This makes it possible to control the change of the current during the chopper control.

(15) The chopper control uses the detection value of the current flowing in the coils (the primary coil L1 and the secondary coil L2) in the transformer T (Tu, Tw) in the chopper circuit unit CP (CPu, CPw). This makes it possible to control the timing when the current flowing in the coil becomes zero with high accuracy.

Second Embodiment

A description will be given of the control system equipped with the electric power conversion circuit (EPC) and the control device capable of controlling the operation of the EPC for the electric rotary machine 10 according to the fourth embodiment of the present invention with reference to FIG. 7.

Figure 7:
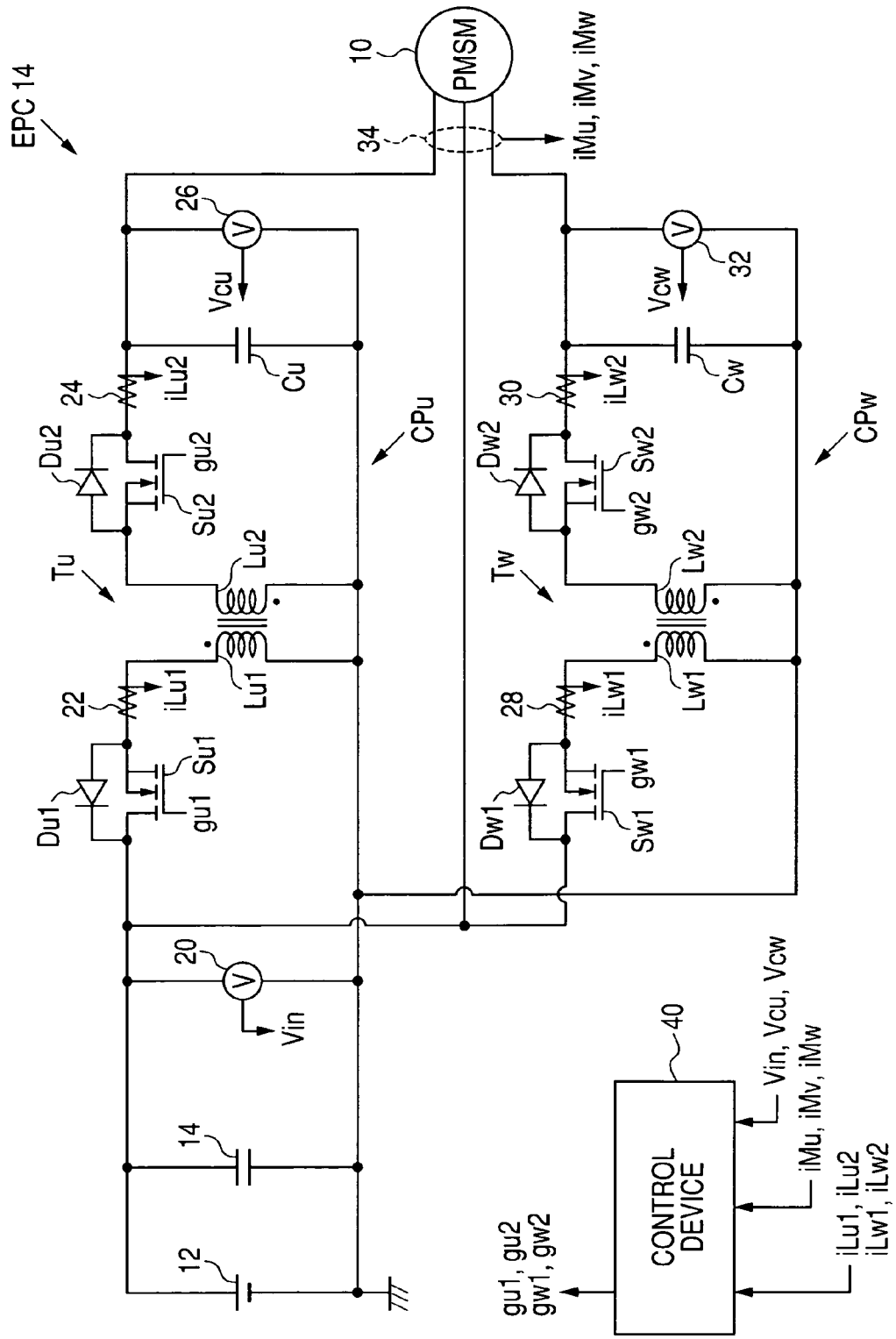
FIG. 7 is a diagram showing an entire configuration of the control system for controlling the operation of the electric rotary machine, and the control system is comprised of the EPC, the control device, and the high voltage battery according to the second embodiment of the present invention.

FIG. 7 is a diagram showing an entire configuration of the control system for controlling the operation of the electric rotary machine. The control system is comprised of the EPC, the control device, and the high voltage battery according to the second embodiment of the present invention.

In the EPC, the control device, and the high voltage battery in the control system according to the second embodiment shown in FIG. 7, the same components of the control system according to the first embodiment shown in FIG. 1 are designated with the same reference numbers and characters.

As shown in FIG. 7, in the EPU 14 for the electric rotary machine 10 according to the second embodiment, the V phase of the electric rotary machine 10 is fixed to the voltage potential at the positive electrode of the high voltage battery 12. The converter units are placed in the EPU 14 for the U phase and the W phase of the electric rotary machine 10. Each of the converter units for the U phase and the W phase is capable of outputting the voltage, the boundary of which is the voltage potential at the negative electrode of the high voltage battery 12, within a range of the variable voltage potential at the positive electrode of the high voltage battery 12. The range of the variable voltage potential at the positive electrode is larger than a difference in voltage potential between the positive and negative electrodes of the high voltage battery 12. Further, the terminals of the U phase and the W phase of the electric rotary machine 10 are connected to the positive electrode of the capacitor C in the EPC 14. The converter units for the for the U phase and the W phase in the EPC 14 according to both the first and second embodiments are designed under the same concept according to the present invention. In particular, in the second embodiment, one of the terminals of the capacitor C is connected to the negative electrode side of the high voltage battery 12. This structure of the EPC 14 according to the second embodiment is difference from that of the first embodiment.

That is, in the structure of the second embodiment, the switching element S1 is connected between the positive electrode side of the high voltage battery 12 and the primary coil L1. The diode D1 is connected in parallel to the switching element S1. The cathode of the diode D1 is connected to the positive electrode side of the high voltage battery 12.

Further, the switching element S2 (Su2, Sw2) is connected between the positive electrode side of the capacitor C (Cu, Cw) and the secondary coil L2 (Lu2, Lw2). The diode D2 (Du2, Dw2) is connected in parallel to the switching element S2 (Su2, Sw2). The cathode of the diode D2 (Du2, Dw2) is connected to the capacitor C (Cu, Cw).

It is possible to operate the EPC 14 according to the second embodiment by the voltage of not less than the voltage potential at the negative electrode of the battery 12 because the voltage potential between both the ends of the capacitor C becomes not less than the voltage potential at the negative electrode of the high voltage battery 12.

The chopper control according to the second embodiment can be performed by the same operation of the first embodiment. The current under the chopper control can be shown in the timing charts (a) to (e) shown in FIG. 2, and the timing charts (a) to (e) shown in FIG. 3.

Third Embodiment

A description will be given of the control system equipped with the electric power conversion circuit (EPC) and the control device 20 capable of controlling the operation of the EPC for the electric rotary machine 10 according to the third embodiment of the present invention with reference to FIG. 8.

Figure 8:
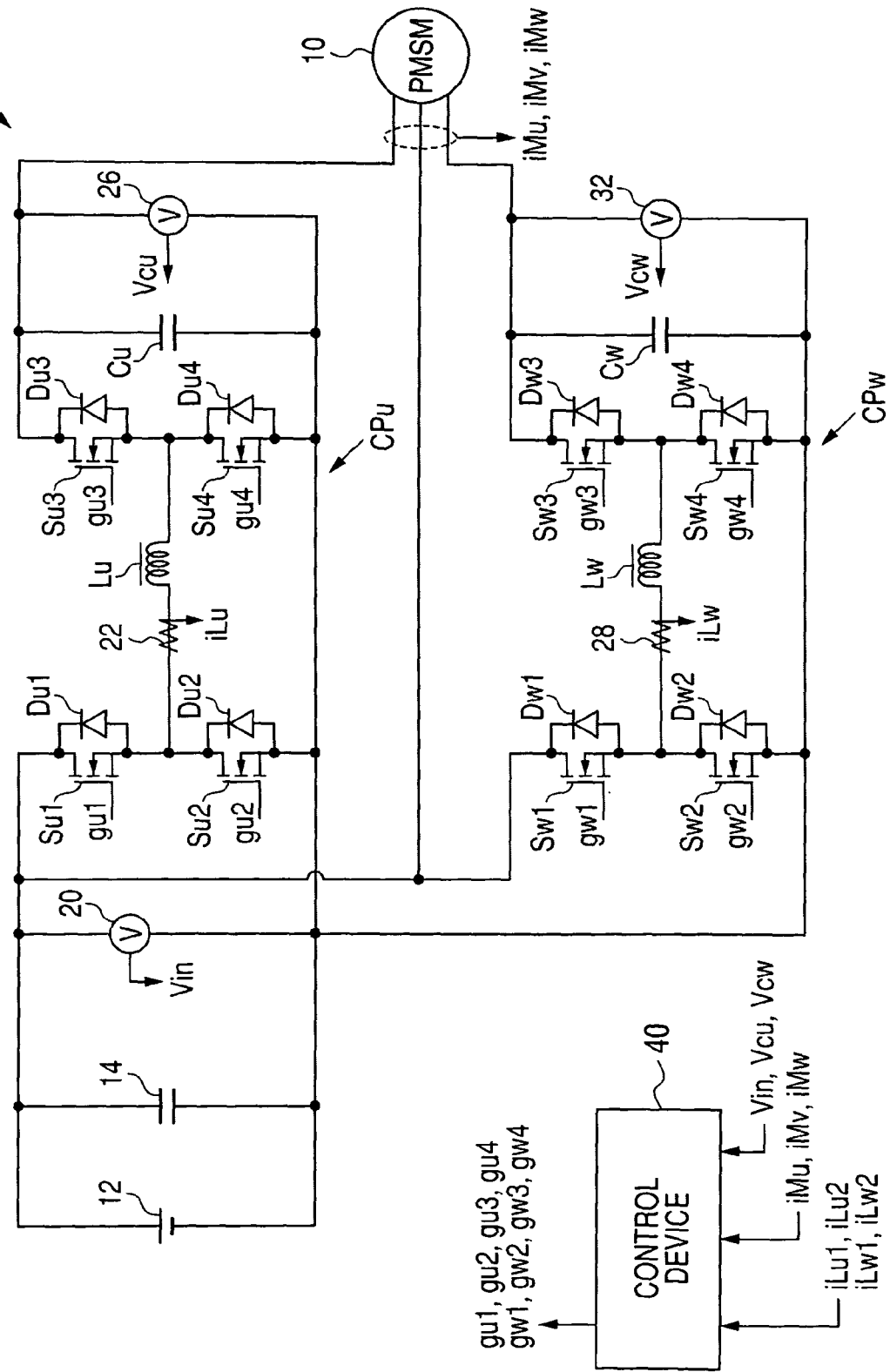
FIG. 8 is a diagram showing an entire configuration of the control system for controlling the operation of the electric rotary machine, and the control system is comprised of the EPC, the control device, and the high voltage battery according to the third embodiment of the present invention.

FIG. 8 is a diagram showing an entire configuration of the control system for controlling the operation of the electric rotary machine 10. The control system is comprised of the EPC, the control device, and the high voltage battery 12 according to the third embodiment of the present invention.

Like the second embodiment, the converter unit in the EPC according to the third embodiment is capable of adjusting the voltage potential, the boundary of which is the voltage potential at the negative electrode of the high voltage battery 12, within a range of the voltage potential at the positive electrode of the high voltage battery 12. The range of the variable voltage potential at the positive electrode is larger than a difference in voltage potential between the positive and negative electrodes of the high voltage battery 12. In particular, as shown in FIG. 8, each of the converter units in the EPC according to the third embodiment of the present invention is equipped with four switching elements S1, S2, S3, and S4. The energy accumulated in the coil is supplied to the capacitor C based on the switching states of the switching elements S1 to S4 under the condition in which the capacitor C is charged with negative electric charge through the terminal of the capacitor C connected to the negative electrode side of the high voltage battery 12.

That is, each of the converter units in the EPC 14 is comprised of a pair of the switching elements S1 and S2, a pair of the switching elements S3 and S4, the coil L, and diodes D1 to D4. The pair of the switching elements S1 and S2 is connected in parallel to the high voltage battery 12. The pair of the switching elements S3 and S4 is connected in parallel to the capacitor C (Cu, Cv). The coil L is connected to a connection node between the pair of the switching elements S1 and S2 and to a connection node between the pair of the switching elements S3 and S4. The diodes D1 to D4 are connected in parallel to the switching elements S1 to S4, respectively. In the diodes D1 to D4, the current direction from the negative electrode of the battery 12 and the capacitor C to the positive electrode thereof is the forward direction.

Figure 9A:
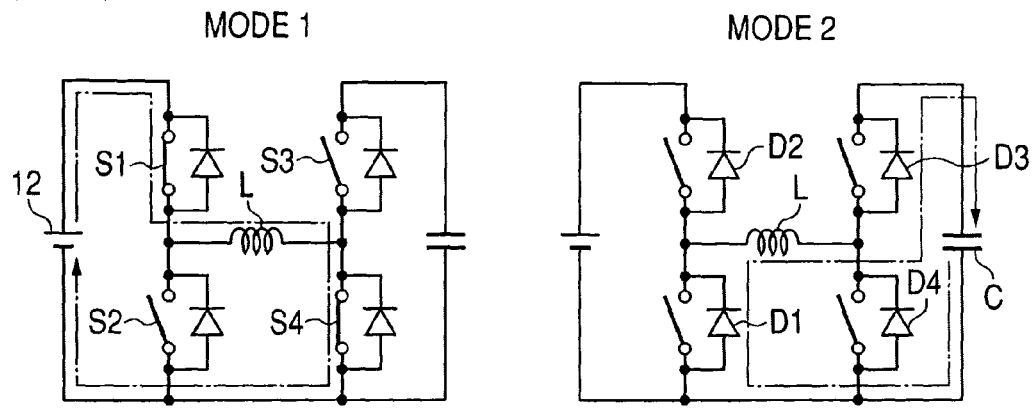
FIG. 9A is a diagram showing the configuration of the chopper circuit part.
Figure 9B:
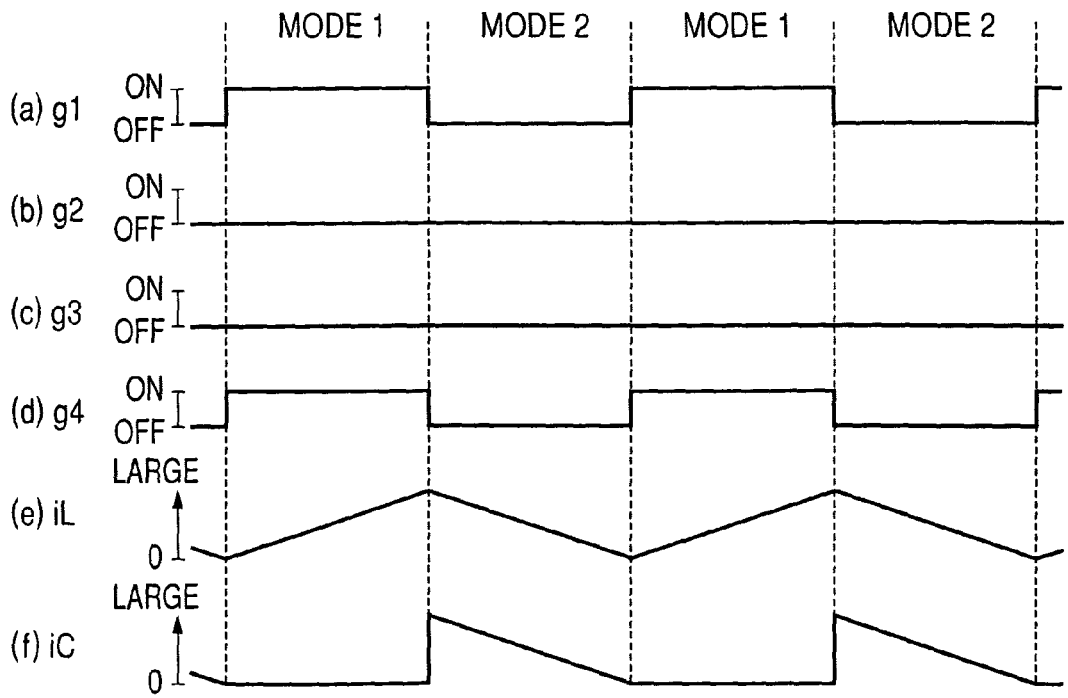
FIG. 9B is timing charts (a) to (f) showing current modes of the chopper control of the chopper circuit part in the EPC shown in FIG. 8.

FIG. 9A is a diagram showing the configuration of the chopper circuit part CP (CPu, CPw) in the EPC according to the third embodiment, and FIG. 9B is timing charts (a) to (f) showing control modes of the chopper control of the chopper circuit part in the EPC shown in FIG. 8.

FIG. 9A shows the chopper control when the chopper circuit part CP outputs the positive output current iC to the capacitor C and the electric rotary machine 10. FIG. 9A shows only one of the converter units in the EPC 14 according to the third embodiment. In particular, FIG. 9A shows the chopper control when the positive output current iC (iC>0) of the chopper circuit part CP flows to the capacitor C and the electric rotary machine 10.

In the case (iC>0) shown in FIG. 9A, it is assumed for brevity that the amount of the electric charge between the capacitor C and the terminals of the electric rotary machine 10 is extremely small, which can be neglected.

FIG. 9A shows the chopper control of the chopper circuit part CP.

The timing chart (a) in FIG. 9B shows the transition of the instruction signal (operation signal) g1 of the switching element S1. The timing chart (b) in FIG. 9B shows the transition of the instruction signal (operation signal) g2 of the switching element S2. The timing chart (c) in FIG. 9B shows the transition of the instruction signal (operation signal) g2 of the switching element S2. The timing chart (d) in FIG. 9B shows the transition of the instruction signal (operation signal) g2 of the switching element S4. The timing chart (e) in FIG. 9B shows the transition of the current iL flowing in the coil L. The timing chart (f) in FIG. 9B shows the transition of the output current iC.

As shown in FIG. 9A, the switching elements S1 and S4 are turned on and the switching elements S2 and S3 are turned off (current mode 1), the loop current flows in a loop circuit comprised of the high voltage battery 12, the switching element S1, the coil L, and the switching element S4. The loop current charges the coil L with energy. In this state, the switching elements S1 and S4 are then turned off, the loop current flows in the loop circuit comprised of the coil L, the diode D3, the capacitor C, and the diode D1 (see current mode 2 shown in FIGS. 9A-B). This operation charges the capacitor C.

FIG. 10A is a diagram showing the configuration of the chopper circuit part and FIG. 10B is a timing chart showing current modes 3 and 4 of the chopper circuit part in the EPC shown in FIG. 8.

FIG. 10A shows the chopper control when a negative output current iC (iC<0) of the chopper circuit part CP flows to the capacitor C (Cu, Cw) and the electric rotary machine 10. FIG. 10A shows one of the converter units that form the EPC 14. In the following explanation, because the amount of electric charge transmitted between the capacitor C and the electric rotary machine 10 is extremely small, which can be neglected.

FIG. 10A shows the chopper control of the chopper circuit part CP. The timing charts (a) to (f) shown in FIG. 10B correspond to the timing charts (a) to (f) shown in FIG. 9B, respectively.

As shown in FIG. 10A, the switching elements S2 and S3 are turned on (current mode 3), the loop current flows in a loop circuit comprised of the capacitor C, the switching element S3, the coil L, and the switching element S2. The loop current charges the energy into the coil L. In this situation, when the switching elements S2 and S3 are turned off, the reversed voltage induced in the coil L flows the current through the loop circuit comprised of the diode D1, the high voltage battery 12, the diode D4 (see current mode 4 shown in FIGS. 10A-B). This charges the high voltage battery 12.

The structure of the control system equipped with the EPC 14 according to the third embodiment has the same effects (1) to (3) and (7) to (15) described in the explanation of the first embodiment of the present invention.

Fourth Embodiment

A description will be given of the control system equipped with the electric power conversion circuit (EPC) and the control device capable of controlling the operation of the EPC for the electric rotary machine 10 according to the fourth embodiment of the present invention with reference to FIG. 11.

Figure 11:
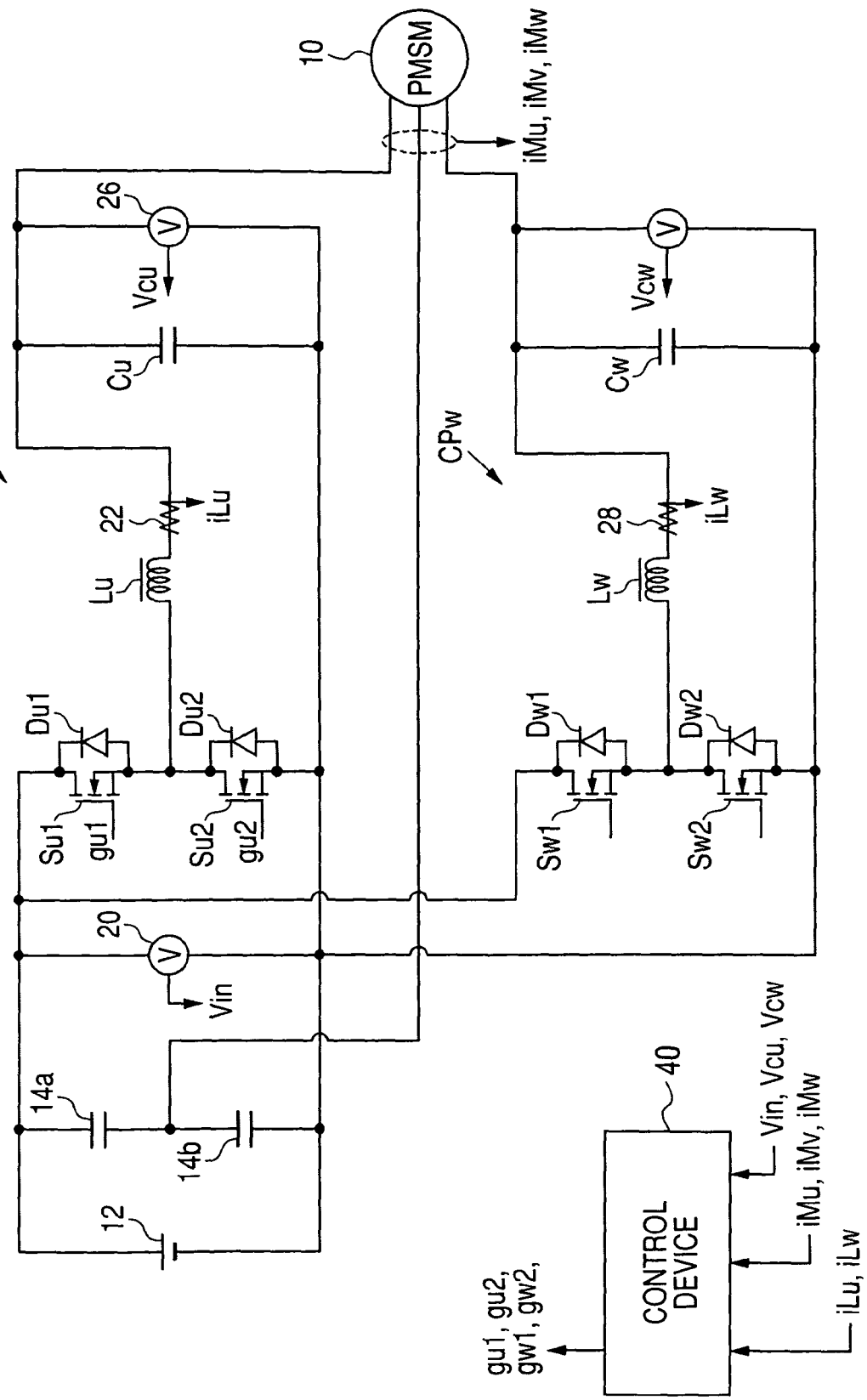
FIG. 11 is a diagram showing an entire configuration of the control system for controlling the operation of the electric rotary machine, and the control system is comprised of the EPC, the control device, and the high voltage battery according to the fourth embodiment of the present invention.

FIG. 11 is a diagram showing an entire configuration of the control system comprised of the EPC 14, the control device 20, and the high voltage battery 12 for controlling the operation of the electric rotary machine 10.

In the control system according to the fourth embodiment shown in FIG. 11, the same components of the control system according to the first embodiment shown in FIG. 1 are designated by the same reference numbers.

The EPC 14 according to the fourth embodiment shown in FIG. 11 uses a buck converter as the converter unit in the EPC 14. The buck converter is comprised of the chopper circuit unit CP (CPu, CPw) and the capacitor C (Cu, Cw). The chopper circuit unit is comprised of a pair of the switching elements S1 (Su1, Su2) and S2 (Su2, Sw2) connected in series, the coil L, and the diodes D1 (Du1, Dw1) and D2 (Du2, Dw2). The pair of the switching elements S1 and S2 is connected in parallel to the high voltage battery 12. Through the coil L, the connection node between the switching elements S1 and S2 is connected to the capacitor C. The diode D1 is connected in parallel to the switching element S1. The diode D2 is also connected in parallel to the switching element S2.

One of the terminals of the capacitor C is connected to the negative electrode of the high voltage battery 12, and the voltage potential thereof is fixed to the voltage potential of the negative electrode of the high voltage battery 12. This makes it possible to continuously adjust the voltage potential of the other terminal of the capacitor C within a range from the voltage potential of the negative electrode to the voltage potential of the positive electrode of the high voltage battery 12.

In the EPC 14 having the above structure, it is necessary to set the voltage of the V phase of the electric rotary machine 10 to the voltage potential within the range between the voltage potential of the positive electrode of the high voltage battery 12 in order to adjust the line voltages Vuv, Vvw within the same voltage range in both direction in positive and negative voltage. In particular, in order to enlarge the allowable absolute value of the line voltages Vuv, Vvw, it is desirable to set the voltage of the V phase to an intermediate value between the voltage potential of the positive electrode and the voltage potential of the negative electrode of the high voltage battery 12. In order to achieve this demand, the V phase of the electric rotary machine 10 is connected to the connection node between a pair of the capacitors 14a and 14b. This structure shown in FIG. 11 can set the voltage of the V phase to the intermediate value in voltage potential between the positive electrode and the negative electrode of the high voltage battery 12.

The control system according to the fourth embodiment shown in FIG. 11 performs the same chopper control of the first embodiment based on the ON time calculated by the method according to the first embodiment. Instead of using the ON time, the control system according to the fourth embodiment can perform the chopper control by switching the switching elements S1 and S2 of the on-state to the off-state at the timing when the current iL flowing in the coil L becomes twice of the output current instruction value iCr.

As described above in detail, the control system comprised of the EPC and the control device 20 according to the fourth embodiment of the present invention has the following effect (16) in addition to the effects (1), and (7) to (15) written in the first embodiment.

(16) The V phase of the electric rotary machine 10 is connected to the connection node between the plurality of the capacitors (for example, between the capacitors 14a and 14b) connected in parallel to the high voltage battery 12. It is thereby possible to adjust the voltage potential of the V phase to a desired voltage potential.

Fifth Embodiment

A description will be given of the control system equipped with the electric power conversion circuit (EPC) and the control device capable of controlling the operation of the EPC for the electric rotary machine 10 according to the fifth embodiment of the present invention with reference to FIG. 12.

In the EPC 14 in the control system according to the first to third embodiment, the voltage potential of one terminal of the capacitor C is fixed to the voltage potential of one electrode of the high voltage battery 12. Because the line voltages Vuv, Vvw are symmetrical to each other, namely, equal in magnitude but opposite in sign (positive and negative), the absolute value of each of the line voltages Vuv, Vvw is set or limited within the voltage Vin of the high voltage battery 12. In order to avoid this limitation, the fifth embodiment uses a converter unit in the EPC 14 capable of shifting the voltage potential of the both terminals of the capacitor C to the voltage potential of the electrodes of the high voltage battery 12.

Figure 12:
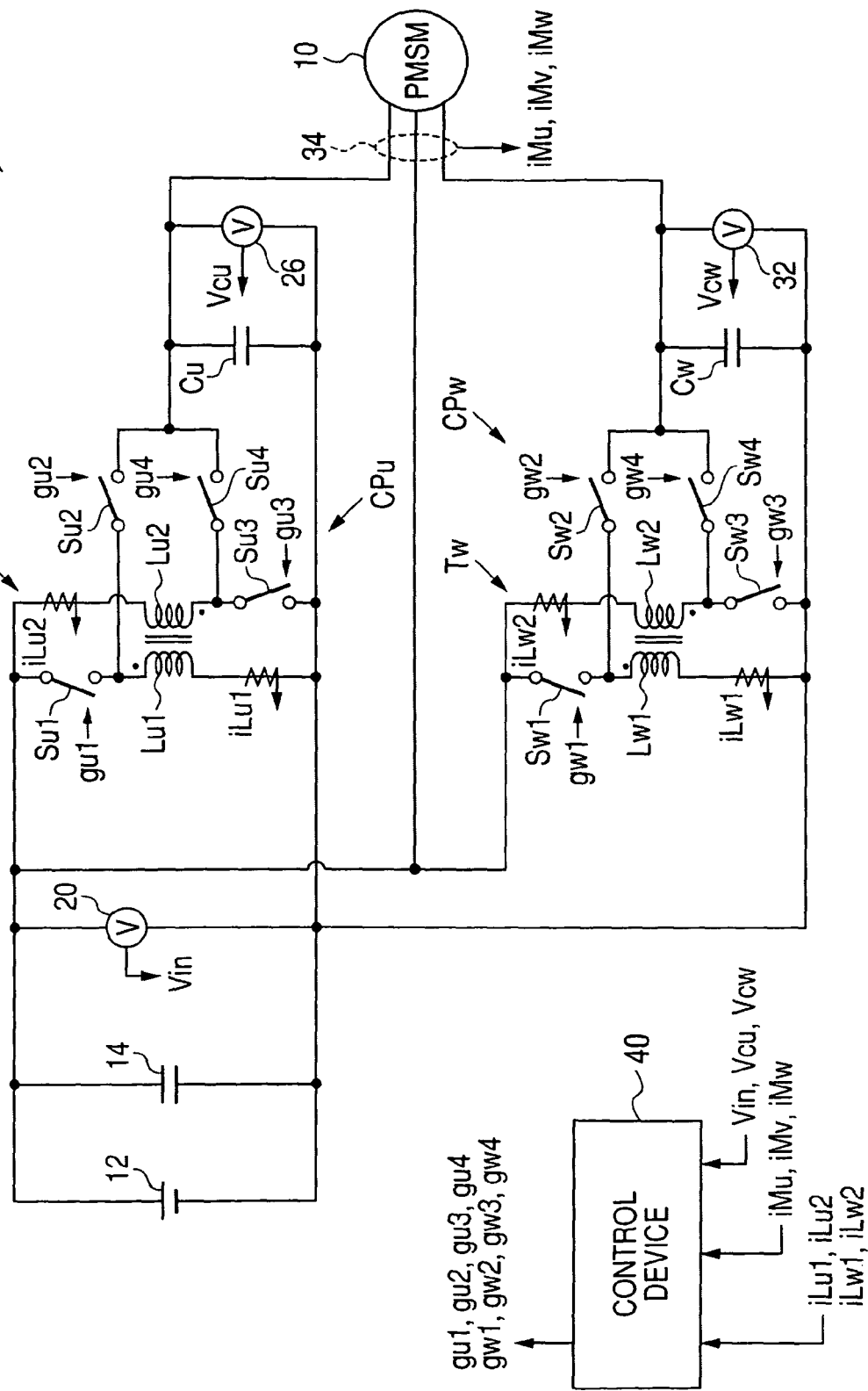
FIG. 12 is a diagram showing an entire configuration of the control system for controlling the operation of the electric rotary machine, and the control system is comprised of the EPC, the control device, and the high voltage battery according to the fifth embodiment of the present invention.

FIG. 12 is a diagram showing an entire configuration of the control system comprised of the EPC 14, the control device 20, and the high voltage battery 12 for controlling the operation of the electric rotary machine 10.

The converter unit in the EPC 14 according to the fifth embodiment is comprised of the capacitor C and the chopper circuit parts CP (CPu, CPw). Each of the chopper circuit parts CP takes two connection states. In one connection state, the coils are connected to the capacitor C so that the energy of the high voltage battery 12 to be supplied to the coils is output to the capacitor C, and one of the terminals of the capacitor C is charged to a positive voltage. In the other connection mode, the coils are connected to the capacitor C so that one terminal of the capacitor C is charged to a negative voltage.

In more detail, the chopper circuit part CP has the transformer T in which a terminal at the starting side of the primary coil L1 and a terminal at the terminating side of the secondary coil L2 are connected together (i.e. make a short circuit), and the other terminal at the terminating side of the primary coil L1 and the other terminal at the starting side of the secondary coil L2 are connected together (i.e. make a short circuit). In other words, each of the pair of the terminals of the primary coil L1 is connected to each of the terminals of the secondary coil L2 in which the mutually induced voltage at the terminal of the primary coil L1 is reversed in voltage polarity relative to the mutually induced voltage at the terminal of the secondary coil L2. The number of turns is same between the primary coil L1 and the secondary coil L2.

The switching element S1 is connected between the terminal at the starting side of the primary coil L1 and the positive electrode of the high voltage battery 12. In addition, the switching element S2 is connected between the connection node between the primary coil L1 and the switching element S1 and the terminal of the capacitor C which is not connected to the negative electrode of the high voltage battery 12. Further, the switching element S3 is connected between the terminal at the starting side of the secondary coil L2 and the negative electrode of the high voltage battery 12.

As shown in FIG. 12, the switching element S4 is connected between two connection nodes, where the former connection node is the connection node between the secondary coil L2 and the switching element S3, and the latter connection node is the connection node between the switching element S2 and the capacitor C.

Figure 13:
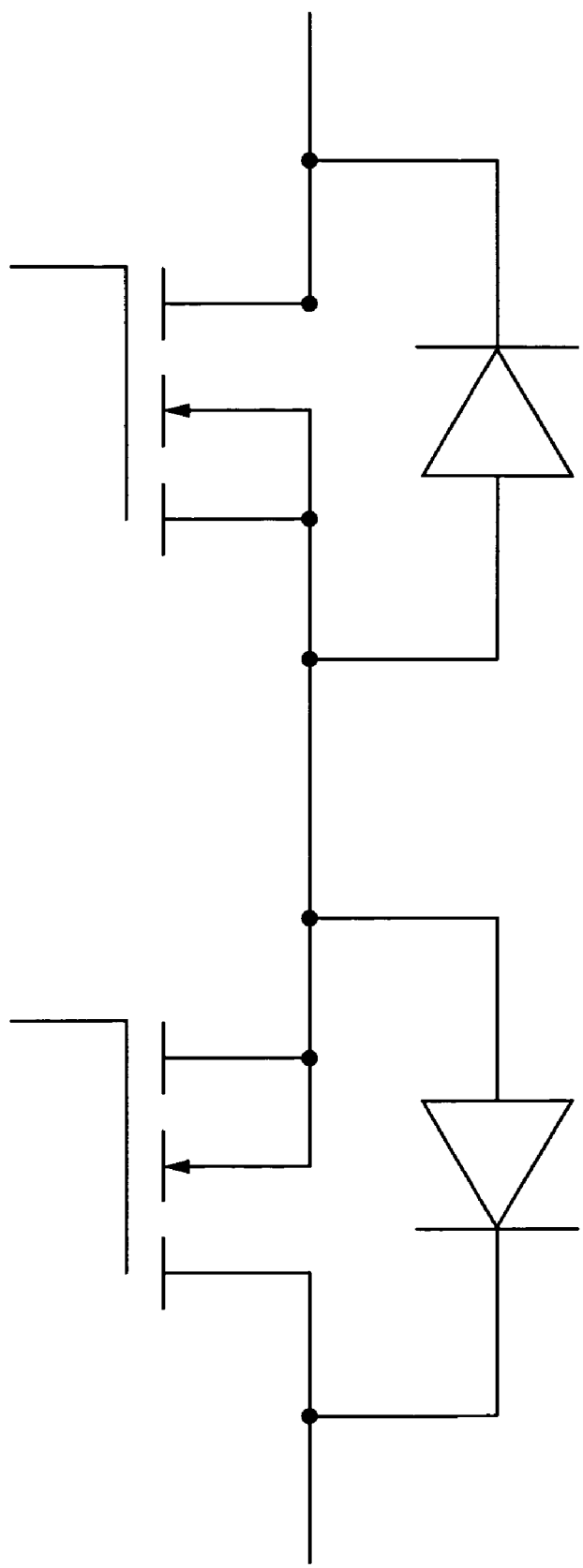
FIG. 13 is a diagram showing a configuration of the switching elements used in the EPC according to the embodiments of the present invention.

Each of the switching elements S1 to S4 has the function to pass and cut a bi-directional current. Specifically, each of the switching elements S1 to S4 in the embodiments according to the present invention, as shown in FIG. 13 is composed of a pair of MOS transistors connected in series. In the MOS transistors connected in series, anodes of body diodes are connected together in order allow the current to flow through the diodes when both the MOS transistors are turned off.

In the chopper circuit part CP (CPu, CPw) shown in FIG. 12, it is possible to make a non-inverted type buck boost converter by alternately turning the switching elements S2 and S3 on and off. That is, when the output current iC is positive, the capacitor C is electrically disconnected from the transformer T by turning the switching element S3 on, and the energy is supplied from the high voltage battery 12 to the secondary coil L2 by connecting the high voltage battery 12 to the secondary coil L2. The transformer T is electrically disconnected from the high voltage battery 12 by turning off the switching element S3 and by turning on the switching element S2. The energy is then supplied from the secondary coil t2 to the capacitor C through the primary coil L1 by connecting the primary coil L1 to the capacitor C.

On the other hand, the transformer T is electrically disconnected from the high voltage battery 12 by turning on the switching element S2 when the output current iC is negative. The energy of the capacitor C is supplied to the primary coil L1 by connecting the primary coil L1 to the capacitor C.

After this, the transformer T is electrically disconnected from the capacitor C by turning off the switching element S2 and turning on the switching element S3. The energy of the primary coil L1 is supplied to the high voltage battery 12 through the secondary coil L2 by connecting the secondary coil L2 to the high voltage battery 12.

It is also possible to make an inverted type buck boost converter by alternately turning on and off the switching elements S1 and S2. That is, when the output current iC is negative, the capacitor C is electrically disconnected from the transformer T by turning on the switching element S1, and the energy of the high voltage battery 12 is supplied to the primary coil L1 by connecting the primary coil L1 to the high voltage battery 12. The transformer T is electrically disconnected from the high voltage battery 12 by turning off the switching element S1 and turning on the switching element S2. The energy of the primary coil L1 is supplied to the capacitor C through the primary coil L2 by connecting the primary coil L1 to the capacitor C.

When the output current iC is positive, the energy of the capacitor C is discharged to the primary coil L1 by connecting the primary coil L1 to the capacitor C under the transformer T is disconnected from the high voltage battery 12 which is obtained by turning off the switching element S1 and turning on the switching element S2.

The energy in the primary coil L1 is supplied to the high voltage battery 12 by connecting the high voltage battery 12 to the primary coil L1 under the condition of disconnecting the capacitor C from the transformer T by turning off the switching element S2 and by turning on the switching element S1.

The present invention is not limited by the above embodiments. For example, it is possible to obtain a boost converter by alternately turning on and off the switching elements S3 and S4. It is also possible to obtain a buck converter by alternately turning on and off the switching elements S2 and S4.

According to the fifth embodiment has the following effect (17) in addition to the effects (1), (7) to (15) written in the first embodiment.

(17) The converter unit is capable of shifting the voltage potential between the terminals of the capacitor C to the voltage potential of the electrode of the high voltage battery 12. This can expand the line voltages Vuv, Vwv.

Sixth Embodiment

A description will be given of the control system equipped with the electric power conversion circuit (EPC) and the control device capable of controlling the operation of the EPC for the electric rotary machine 10 according to the sixth embodiment of the present invention with reference to FIG. 14.

Figure 14:
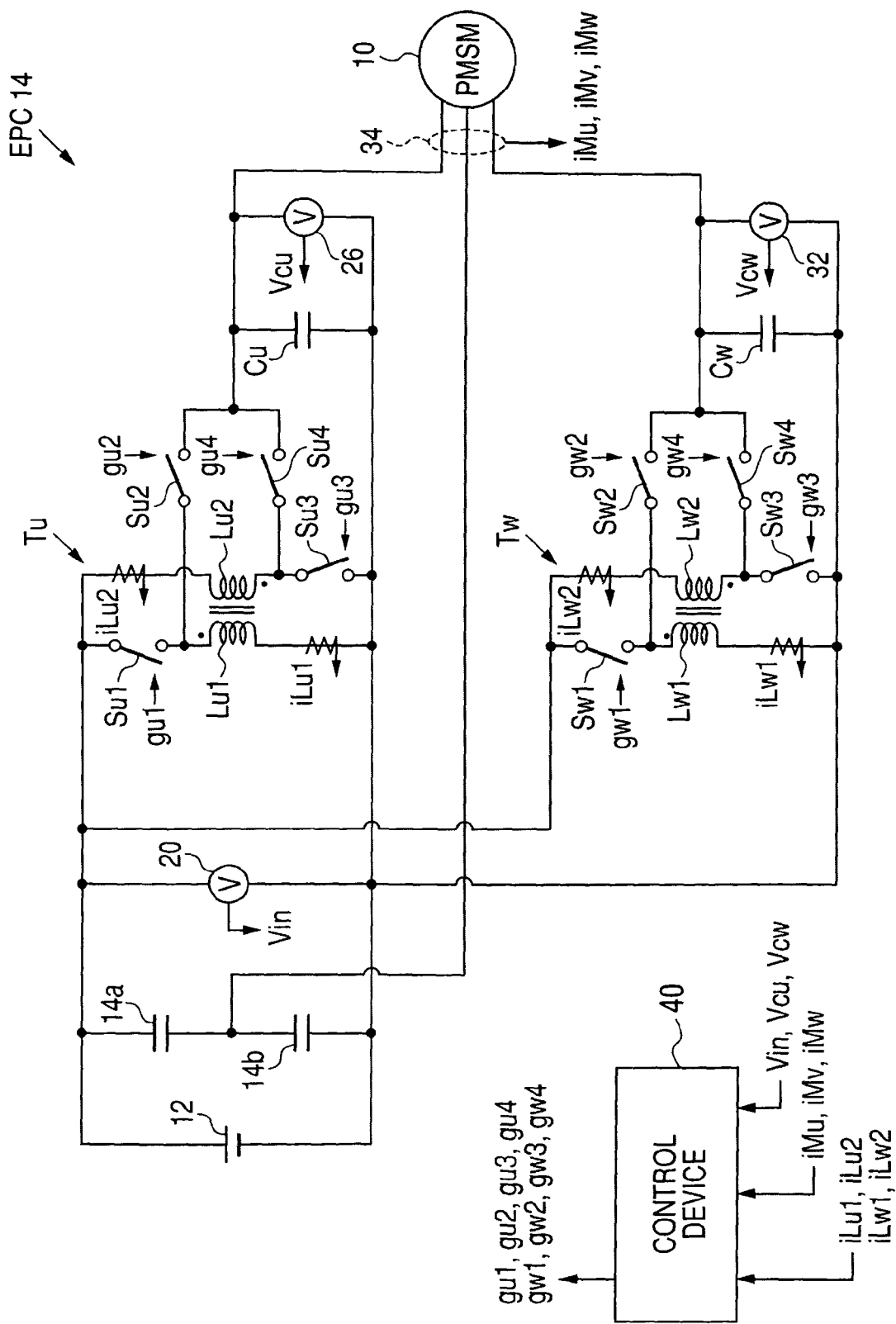
FIG. 14 is a diagram showing an entire configuration of the control system for controlling the operation of the electric rotary machine, and the control system is comprised of the EPC, the control device, and the high voltage battery according to the sixth embodiment of the present invention.

In the control system according to the sixth embodiment shown in FIG. 14, the same components of the control system according to the fifth embodiment shown in FIG. 12 are designated with the same reference numbers and characters.

As shown in FIG. 14, the V phase of the electric rotary machine 10 is connected to a connection node between a pair of the capacitors 14a and 14b. The capacitors 14a and 14b are connected in parallel to the high voltage battery 12. The converter units in the EPC according to the sixth embodiment can theoretically shift the absolute value of the voltage potential of the V phase, in bi-directions (positive and negative directions), against the voltage potential at the negative electrode of the high voltage battery 12. The response characteristics of the voltage shift operation are varied according to the voltage potential of the shifted voltage potential. That is, the voltage potential of the V phase is set so that various functions such as the response characteristics become full equal together when the voltage potentials of the U phase and the W phase are varied in bi-directions (positive and negative directions).

This control can be obtained by adjusting the electrostatic capacitor of the capacitors 14a and 14b. That is, the electrostatic capacities of the capacitors 14a and 14b in the sixth embodiment are not always equal to each other, like the structure of the EPC 14 according to the fourth embodiment.

Other Modifications

Each of the first to fifth embodiments can be modified as follows.

The present invention is not limited by the structure of the chopper circuit part CP (CPu, CPw) in the EPC according to the first embodiment shown in FIG. 1. For example, the switching elements S1 (Su1, Sw1) and S2 have the functions of the diodes D1 (Du1, Dw1) and D2 (Du2, Dw2). In this modification, the diodes D1 (Du1, Dw1) and D2 (Du2, Dw2) are eliminated instead.

Similarly, the present invention is not limited by the structure of the chopper circuit part CP (CPu, CPw) in the EPC according to the second embodiment shown in FIG. 7. For example, the functions of the diodes D1 (Du1, Dw1) and D2 (Du2, Dw2) can be achieved by selectively controlling the switching elements S1 (Su1, Sw1) and S2. The diodes D1 (Du1, Dw1) and D2 (Du2, Dw2) are eliminated instead.

The present invention is not limited by the structure of the chopper circuit part CP (CPu, CPw) in the EPC according to the fourth embodiment shown in FIG. 11 in which the capacitors 14a and 14b have the same electrostatic capacity. For example, it is possible to have the structure in which the electrostatic capacity of the capacitor 14a is larger than that of the capacitor 14b. This structure can increase the voltage potential of the P phase rather than the value of Vin/2. This structure makes it possible to eliminate that the voltage of the capacitor C becomes zero while suppressing the decrease of the maximum value of the line voltage of the phases of the electric rotary machine 10. This structure further makes it possible to lengthen the period of time until the current flowing in the coil L becomes gradually decreased and finally zero, and thereby possible to avoid the problem to deteriorate the function of the chopper control.

The present invention is not limited by the structure of the chopper circuit part CP (CPu, CPw) in the EPC according to the fifth and sixth embodiment. For example, it is possible to use a pair of insulated gate bipolar transistors (IGBT) instead of a pair of the MOS FETs.

The present invention is not limited by the structure of the converter unit used in the fifth embodiment and the sixth embodiment shown in FIG. 12 and FIG. 14 in which the converter unit has the switching means to switch the first connection state to the second connection state. In the first connection state, the coil L is connected to the capacitor C in order to charge the positive electric charge to one terminal of the capacitor C by supplying the energy of the high voltage battery 12 to the capacitor C. In the second connection state, the coil L is connected to the capacitor C in order to charge the electric charge to the other terminal of the capacitor C by supplying the energy of the high voltage battery 12 to the capacitor C.

For example, it is possible to have the structure in which the chopper circuit part as a buck converter and the chopper circuit part shown in FIG. 7 are connected through the single capacitor C. In the buck converter, a single coil is used instead of the coils L1 (Lu1, Lw1), L2 (Lu2, Lw2) of the transformer T in the converter unit shown in FIG. 7, and the connection of the diode D2 shown in FIG. 7 is reversed.

Still further it is also possible to have a structure in which an inverted type buck boost converter is connected to a non-inverted type buck boost converter. It is also possible to eliminate the switching element S4 from the chopper circuit part CP in the EPC according to the fifth embodiment shown in FIG. 12.

In the structure shown in FIG. 12, it is possible to fix one terminal of the capacitor C to the voltage potential of the positive electrode of the high voltage battery 12, instead of to the voltage potential of the negative electrode. In this structure, it is possible to simply charge both the terminals of the capacitor C with the positive electric charge unless the following two connection states can be obtained. In one connection state, the energy supplied to one of the primary coil L1 and the secondary coil L2 in the transformer from the high voltage battery 12 is directly supplied to the capacitor C. In the other connection state, the energy is supplied to the capacitor C through one of or both the pair of the primary and secondary coils in the transformer.

In the structure of the first, second, third, or fourth embodiment previously described, it is possible to switch the off state to the on state of the switching elements S1, S2, S3, S4 by decreasing the current flowing in the coil L to a predetermined amount of the current, instead of switching the switching element S1, S2, S3, or S4 of the off-state to the on-state by decreasing the current flowing in the coil L, L1, or L2 to a limit current value. Although this case needs a complicated calculation to obtain the period of on-time, it is possible to use the same calculation method previously described.

The present invention is not limited by the feedback control for the line voltages Vuv, Vvw previously described. It is possible to use the proportional integral (PI) control, or the proportional integral derivative (PID) control The present invention is not limited by the method to calculate the output current instruction value iCr based on a difference between the instruction line voltages Vuvr, Vvwr and the line voltages Vuv, Vvw for controlling the electric rotary machine 10. For example, it is possible to calculate the output current instruction value iCr based on a varied value of the instruction line voltages Vuvr, Vvwr because there is a correlation between the varied value of the instruction line voltages Vuvr, Vvwr and the amount of electric charge required for the capacitors Cu, Cw. In this case, it is possible to effectively calculate the output current instruction value iC unless adding phase currently-detected currents iMu, iMw even if a power factor of the electric rotary machine 10 is varied. It is possible to perform the feed forward control for such an opening loop control so that the voltage of the capacitor C is calculated and shifted to the line voltages Vuvr, Vvwr based on the currently-detected phase currents iMu, iMw, the output current instruction value iCr previously obtained, and the capacitor C. It is further possible to use both the feed forward control and the feedback control to adjust the feed forward control.

It is also possible to use a three phase instruction current obtained by converting the instruction currents idr, iqr in three phase conversion instead of using the phase currents iMu, iMv, and iMw.

In each of the embodiments described above, the detection means detects the currents flowing through the coil L, the primary coil L1, the secondary coil L2, and the detection current values are used. The present invention is not limited by this. For example, it is possible to use the current calculated based on the voltage of the capacitor C and the voltage Vin of the high voltage battery.

The present invention is not limited by using the calculated values based on the instruction currents idr, iqr on d axis and q axis as the instruction phase voltages Vur, Vvr, Vwr. For example, it is acceptable to use the calculation value based of a difference between the real rotation speed and the instruction rotation value when the rotation speed of the electric rotary machine 10 is used as the instruction value.

It is possible to control the control values of the electric rotary machine 10 by the means for calculating the instruction line voltages Vuvr, Vvwr as the operation values or control values to adjust the control values such as the torque and the rotation speed of the electric rotary machine 10 to the target value instead of using the means for calculating the instruction phase voltages Vur, Vvr, Vwr.

In each of the embodiments described above, it is possible to calculate the voltage of the capacitor C based on the varying speed of the current that is calculated by the detection value of the currents flowing in the coil L, the primary coil L1, the secondary coil L2 instead of using the means to detect the voltage of each capacitor.

The present invention is not limited by the means for directly using the current of each phase of the electric rotary machine 10 to calculate the output current instruction values iCr based on the instruction line voltages Vuvr, Vvwr. For example, it is possible to use the means for calculating the output current instruction value iCur based on the instruction phase voltages Vur, Vvr, Vwr without using the current value flowing in the electric rotary machine 10 as the direct input parameter because the instruction phase voltages Vur, Vvr, Vwr include the phase information of the current flowing in the electric rotary machine 10 on performing the control to fix the power factor of the electric rotary machine 10.

On the other hand, it is also possible to effectively adjust the electric charge of the capacitor C by the chopper control based on the output current instruction value iCr when compared with the feedback control to directly return the line voltages Vuv, Vvw to the instruction phase voltages Vur, Vvr, Vwr.

The present invention is not limited by the means to control the voltage of the capacitor C based on the current flowing in the terminals of the electric rotary machine 10, and the instruction phase voltages Vur, Vvr, Vwr disclosed in the embodiments and the modifications thereof. For example, it can be understood from the process disclosed in FIG. 4 to calculate the parameters such as the ON times t1 and t2 to set the chopper control condition based on the instruction line voltages Vuvr, Vvwr, and the phase currents iMu, iMw as input parameters. It is possible to perform the chopper control using a map in which the instruction line voltages Vuvr, vvwr, and the phase currents iMu, iMw are input parameters and the parameters to set the condition of the chopper control are the output parameters.

Still further, it is possible to use the parameters to set the condition of the chopper control as the output value for the proportional elements which inputs a difference between the instruction line voltages Vuvr, Vvwr, and the line voltages Vuv, Vvw.

It is possible to apply the EPC and the control device according to the present invention to a five phase electric rotary machine as a multiphase electric rotary machine, instead of the three phase electric rotary machine explained as a control target in the first to sixth embodiments.

It is possible to place the converter unit according to the present invention for each of four phases other than a predetermined phase in the five phase electric rotary machine, not to place the converter unit to each of the five phases. This structure makes it possible to control the multiphase electric rotary machine by adjusting the line voltages between the predetermined phase and each of the remaining phases. This can decrease the total number of the components in the control system comprised of the EPC, the control device, and the high voltage battery.

In the embodiments described above, the EPC 14 is applied to the multiphase electric rotary machine as the power source for hybrid vehicles. The present invention is not limited by this application. It is possible to apply the control system composed of the EPC 14, the control device, and the high voltage battery according to the present invention to multiphase electric rotary machines for electric vehicles.

Still further, it is possible to connect the EPC 14 to an air conditioning system instead of the electric rotary machine as the power source for vehicles. It is further possible to connect the EPC 14 to an electric rotary machine as an actuator for data reproducing devices and data recording devices for disk mediums for use in hard disk drives.

Still further, it is possible to apply the EPC 14 to an electric rotary machine mounted on a fuel pump for a vehicle.

Other Features and Effects of the Present Invention

In the electric power conversion circuit as another aspect of the present invention, one of a pair of output terminals of the voltage conversion means is connected to one of a pair of electrodes of the electric power supply means, and the other terminal of the voltage conversion means outputs an adjusted voltage, a polarity thereof is same as that of the other electrode of the electric power supply means, and an adjustable range thereof is larger than that of the voltage of the electric power supply.

The voltage potential at the predetermined phase of the multiphase electric rotary machine is fixed to a voltage potential at the other electrode of, not fixed to a voltage potential at one electrode of the electric power supply means. For example, the predetermined phase is V phase, and the electric power supply means is the high voltage battery 12 in the embodiments. This structure makes it possible to adjust the line voltage between the predetermined phase and one of the other phases to a desired voltage in both the positive and negative directions (in bi-directional directions). In particular, because this structure allows the voltage between the pair of the terminals of the capacitor to be greater than the voltage between the pair of the electrodes of the electric power supply means, it is possible to have the maximum value of the line voltage which is greater than a half value of the voltage between the pair of the electrodes of the electric power supply means.

In the electric power conversion circuit as another aspect of the present invention, the voltage conversion means has a capacitor means, a coil, and a connection means. One of the terminals of the capacitor means is connected to either a positive electrode or a negative electrode of the electric power supply means. The connection means is capable of electrically connecting the coil to the capacitor means so that one of the terminals of the capacitor means is varied by electric charge corresponding to the voltage potential of one of the electrodes of the electric power supply means when the energy in the coil supplied from the electric power supply means is output to the capacitor means.

When one of the terminals of the capacitor means is connected to the positive electrode of the electric power supply means, this terminal of the capacitor means is charged with positive electric charge. On the other hand, when connected to the negative electrode of the electric power supply means, this terminal of the capacitor means is charged with negative electric charge. This allows adjustment of the voltage potential of the other phases from the voltage potential of the electrode of the electric power supply means connected to the capacitor means to the voltage potential of the other electrode of the electric power supply means by the voltage supplied from the voltage conversion means. It is therefore possible to adjust the line voltage, which is the difference in voltage potential between the predetermined phase and one of the other phases, to a positive voltage or a negative voltage by setting the voltage potential of the predetermined phase to the voltage potential of the other electrode other than the electrode of the electric power supply means connected to the capacitor means.

The voltage conversion means has the connection means capable of connecting the electrodes of the electric power supply means to both of the terminals of the coil under the condition of electrically disconnecting the capacitor means from the coil before the energy is output to the capacitor means. It is desirable that the connection means connects the capacitor means with the coil under the condition of electrically disconnecting the electric power supply means from the coil.

In the electric power conversion circuit as another aspect of the present invention, the voltage conversion means has a capacitor means, a transformer, a first switching means, and a second switching means. One of the terminals of the capacitor means is connected in parallel to a pair of output terminals of the voltage conversion means. The transformer has a primary coil and a secondary coil. A short circuit is made between one of terminals of the primary coil and one of terminals of the secondary coil having a polarity of a mutually-induced voltage which has an opposite polarity to one of the terminals of the primary coil. The first switching means is capable of opening and closing a first loop circuit composed of the primary coil and the electric power supply means. The second switching means is capable of opening and closing a second loop circuit composed of the secondary coil and the capacitor means.

One of the electrodes of the electric power supply means is connected to one of the terminals of the capacitor means through the transformer. The voltage potential of one of the terminals of the capacitor means becomes the voltage potential of one of both the electrodes of the electric power supply means. When one of the terminals of the capacitor means is connected to the positive electrode of the electric power supply means by setting the polarity of a mutually-induced voltage in the transformer, this terminal of the capacitor means is charged with positive electric charge. On the other hand, when this terminal of the capacitor means is connected to the negative electrode of the electric power supply means by setting the polarity of a mutually-induced voltage in the transformer, this terminal of the capacitor means is charged with negative electric charge. It is thereby possible to adjust the voltage of each of the phases other than the predetermined phase within the voltage potential of the other electrode and up to the voltage potential of one electrode of the electric power supply means by the voltage supplied by the voltage conversion means. This makes it possible to adjust the line voltage as a voltage difference between the predetermined phase and one of the other phases to the voltage in both positive and negative by setting the voltage potential of the predetermined phase to the voltage potential of the other electrode other than the voltage potential of one electrode of the electric power supply means.

In the electric power conversion circuit as another aspect of the present invention, the voltage conversion means further has a first diode and a second diode. Through the first diode, a current flows in the second loop circuit comprised of the secondary coil and the capacitor means by turning off the first switching element connected to the primary coil. Through the second diode, a current flows in the first loop circuit comprised of the primary coil and the electric power conversion circuit by turning off the second switching element connected to the secondary coil.

It is thereby possible to flow the current in the secondary coil through the diode without turning on the switching element connected to the secondary coil by turning off the switching element connected to the primary coil. It is in addition possible to flow the current in the primary coil through the diode without turning on the switching element connected to the primary coil by turning off the switching element connected to the secondary coil.

In the electric power conversion circuit as another aspect of the present invention, the voltage conversion means further has a capacitor means, a pair of switching elements, another pair of switching elements, and a coil. The capacitor means is connected in parallel to a pair of output terminals of the voltage conversion means. The pair of the switching elements is connected in parallel to the electric power supply means. The pair of the switching elements is connected in parallel to the capacitor means. The coil is connected between a connection node and another connection node. The former connection node is a node between the pair of the switching elements connected in parallel to the electric power supply means. The latter connection node (or another connection node) is a node between the pair of the switching elements connected in parallel to the capacitor means.

Because the voltage conversion means has the above structure in which the voltage between the pair of the terminals of the capacitor means is greater than the voltage between the pair of the electrodes of the electric power supply means, it is possible to increase the maximum voltage of the line voltage rather than the half value of the voltage between the pair of the electrodes of the electric power supply means.

In the electric power conversion circuit as another aspect of the present invention, the voltage conversion means further has a capacitor means, a coil, and a switching means. One of terminals of the capacitor means is fixed at a voltage potential of the electrode of the electric power supply means. The switching means is capable of switching a first connection state and a second connection state. In the first connection state the coil and the capacitor means are connected to supply positive electric charge to one of terminals of the capacitor means by outputting the energy accumulated in the coil to the capacitor means. The energy accumulated in the coil is supplied from the electric power supply means. In the second connection state, the coil and the capacitor means are connected to supply positive electric charge to the other terminal of the capacitor means by outputting the energy accumulated in the coil to the capacitor means. The energy accumulated in the coil is also supplied from the electric power supply means.

Because both the terminals of the capacitor means can be charged with positive electric charge, it is possible to adjust the output voltage of the voltage conversion means in both of positive and negative. It is thereby possible to adjust the line voltage as the difference in potential between the predetermined phase and one of the other phases to both a positive voltage and a negative voltage. The voltage conversion means has the connection means capable of connecting both the terminals of the coil with each of the electrodes of the electric power supply means under the condition of electrically disconnecting the coil from the capacitor means. It is preferred that the coil is connected to the capacitor means under the condition of electrically disconnecting the coil from the electric power supply means in at least one of the two connection states.

In the electric power conversion circuit as another aspect of the present invention, the coil in the voltage conversion means is a coil of a transformer. The structure having the transformer in the voltage conversion means makes it possible to easily obtain the two connection states prescribed above while fixing one of the pair of the terminals of the capacitor means to the voltage potential of the electrode of the electric power supply means.

In the electric power conversion circuit as another aspect of the present invention, the voltage conversion means has a capacitor, a transformer, a first switching element, a second switching element, and a third switching element. The transformer is comprised of a primary coil and a secondary coil. The primary coil and the secondary coil are connected in parallel to the electric power supply means. The primary coil is connected in parallel to the electric power supply means. The first switching element is capable of opening and closing a connection between the primary coil in the transformer and a positive electrode terminal of the electric power supply means. The second switching element is capable of opening and closing a connection between the capacitor means and a connection node between the primary switching element and the primary coil. The third switching element is capable of opening and closing a connection between a negative electrode terminal of the electric power supply means and one of terminals of the secondary coil in the transformer having a same voltage potential of a mutually induced voltage at the terminal in the primary coil connected to the first switching element.

In the electric power conversion circuit as another aspect of the present invention, one of the phases other than the predetermined phase is connected to either a positive electrode or a negative electrode of the electric power supply means.

In the electric power conversion circuit as another aspect of the present invention, the predetermined phase is connected to a connection node between a plurality of capacitor means connected in parallel to the electric power supply means.

This structure makes it possible to adjust the voltage of the predetermined phase of the multiphase electric rotary machine by the electrostatic capacity of the capacitor means. It is also possible to design the electrostatic capacity of the plurality of the capacitor means so that the voltage potential at the connection node is shifted from the central voltage potential between both the electrodes of the electric power supply means.

In accordance with another aspect of the present invention, there is provided a control device capable of controlling control values for the multiphase electric rotary machine by operating the electric power conversion circuit previously described. The control device has a control means which uses a line voltage as an instruction line voltage. The line voltage is a difference between voltages of two phases in the multiphase electric rotary machine.

The current flowing in the multiphase electric rotary machine is controllable based on the line voltages. It is possible to adjust the control values for the multiphase electric rotary machine by adjusting the line voltage of the multiphase electric rotary machine to the instruction line voltage.

The control device as another aspect of the present invention has a setting means and a calculation means. The setting means sets an instruction phase voltage for the multiphase electric rotary machine. The calculation means calculates the instruction line voltage based on the instruction phase voltage.

The control device according to the present invention uses the instruction phase voltage as the operation value to control the control amount for the multiphase electric rotary machine. For example, it is possible to use a device operable under a known logic (or a known program) to generate the instruction phase voltage for setting each of the phases of the multiphase electric rotary machine.

In the control device as another aspect of the present invention, the voltage conversion means has a capacitor means, and a chopper circuit part. The capacitor means is connected in parallel to the output terminals of the voltage conversion means. The chopper circuit part is placed between the capacitor means and the electric power supply means. The control means has a current instruction value calculation means and an operation means. The current instruction means is capable of calculating an output current instruction value of the chopper circuit part based on the instruction line voltage. The operation means is capable of performing a chopper control of the chopper circuit part based on the output current instruction value of the chopper circuit part.

The control device calculates the output current instruction value of the chopper circuit part. This can control the output current which is requested on controlling the voltage of the capacitor means based on the instruction line voltage. It is further possible to control the voltage of the capacitor means based on the instruction line voltage. Thus, the control device according to the present invention effectively controls the line voltage of the multiphase electric rotary machine.

In the control device as another aspect of the present invention, the current instruction value calculation means adds a current flowing in the terminals of the multiphase electric rotary machine connected to the capacitor means when calculating the output current instruction value of the chopper circuit part.

The current flowing in the terminals of the multiphase electric rotary machine is a current between the voltage conversion circuit and the multiphase electric rotary machine. This current often causes fluctuation of the voltage of the capacitor means when it is controlled based on the instruction line voltage. In the control device according to the present invention, the output current instruction value of the chopper circuit part is calculated while considering the current flowing in the terminals of the multiphase electric rotary machine. The fluctuation can be eliminated by performing the feed forward control. This makes it possible to efficiently control the voltage of the capacitor means.

In the control device as another aspect of the present invention, the control means sets the line voltage of the multiphase electric rotary machine to the instruction line voltage based on the input and output amount of electric charge between the voltage conversion circuit and the multiphase electric rotary machine, and the instruction line voltage for the multiphase electric rotary machine.

When the voltage of the capacitor means is controlled based on the instruction line voltage, the voltage of the capacitor means is fluctuated by the input and output amount of the electric charge between the multiphase electric rotary machine and the voltage conversion circuit. Even if the voltage of the capacitor means is increased, it is not always requested to set the output current from the chopper circuit part to a positive value, and it is often requested that the chopper circuit part outputs a positive output current. The control device according to the present invention can efficiently control the voltage of the capacitor means based on the instruction line voltage by considering the output and input amount of the electric charge between the electric power conversion circuit and the multiphase electric rotary machine. This can efficiently control the line voltage based on the instruction line voltage. It is preferred that the line voltage is controlled by the instruction line voltage based on the detection value of the output and input amount of the electric charge between the electric power conversion circuit and the multiphase electric rotary machine.

In the control device as another aspect of the present invention, the voltage conversion means has a capacitor means and a chopper circuit part. The control means has a current instruction value calculation means and an operation means. The capacitor means is connected in parallel to the output terminals of the voltage conversion means. The chopper circuit part is placed between the capacitor means and the electric power supply means. The current instruction value calculation means in the control device is capable of calculating an output current instruction value of the chopper circuit part based on the instruction line voltage and the input and output amount of the electric charge. The operation means in the control device is capable of performing a chopper control of the chopper circuit part based on the output current instruction value of the chopper circuit part.

It is thereby possible to obtain the output current by calculating the instruction output current value of the chopper circuit part. The output current of the chopper circuit part is requested when the voltage of the capacitor means is controlled based on the instruction line voltage. This makes it possible to effectively control the voltage of the capacitor means based on the instruction line voltage. It is thereby possible to effectively control the line voltage of the multiphase electric rotary machine based on the instruction line voltage.

In the control device as another aspect of the present invention, the current instruction value calculation means calculates the output current instruction value of the chopper circuit based on a difference between an actually-detected line voltage and the instruction line voltage.

It is thereby possible to simply and efficiently control the voltage of the capacitor means based on the instruction line voltage when the output current instruction value is calculated using the above difference between the actually-detected line voltage and the instruction line voltage.

In the control device as another aspect of the present invention, the operation means performs the chopper control so that the mean value of the output current of the chopper circuit part is equal to the output current instruction value.

When the current flowing in the chopper circuit part is fluctuated on performing the chopper control, it is difficult to use the output current of the chopper circuit part as the output current instruction value in a microscopic time scale. The control device according to the present invention uses the mean value of the output current for a predetermined period as the output current instruction value. This makes it possible to agree the output current with the output current instruction value, and thereby possible to control the voltage of the capacitor means based on the instruction line voltage.

In the control device as another aspect of the present invention, the operation means repeatedly performs the chopper control so that the current flowing in the coil in the chopper circuit part is gradually increased and decreased, and the mean value of the output current from the chopper circuit part becomes equal to the output current instruction value during a period for the above current increasing and decreasing control.

When the current flowing in the coil in the chopper circuit part is gradually and repeatedly increased and decreased under the chopper control, it is difficult to use the output current of the chopper circuit part as the output current instruction value in a microscopic time scale. Because using the mean value of the output current of the chopper circuit part per period of the above current increasing and decreasing change, the control device according to the present invention can agrees the output current of the chopper circuit part with the output current instruction value during a relatively short time scale. This makes it possible to effectively control the voltage of the capacitor means according to the instruction line voltage.

In the control device as another aspect of the present invention, the operation means varies the operation state of the switching element for the chopper control so that the mean value of the output current from the chopper circuit part becomes equal to the output current instruction value during one period of on-off operation of the switching element in the chopper circuit part.

The current flowing in the chopper circuit part is usually fluctuated by on and off operation of the switching element. In this case, the output current of the chopper circuit part is also varied. It is accordingly difficult to use the output current of the chopper circuit part as the output current instruction value in a microscopic time scale. Because using the mean value of the output current of the chopper circuit part per period of the on and off operation of the switching element, the control device according to the present invention can match the output current of the chopper circuit part to the output current instruction value during a relatively short time scale. This makes it possible to effectively control the voltage of the capacitor means according to the instruction line voltage.

In the control device as another aspect of the present invention, the operation means switches the switching element for the chopper control of the chopper circuit part so that the switching element of the off state is switched to the on state by setting the amount of the current flowing in the coil in the chopper circuit part, where the ON time of the switching element is a variable operation value.

According to the present invention, the current flowing in the coil is increased by turning on the switching element whenever the current flowing in the coil becomes zero. This makes it possible to relatively-easily calculate the current flowing in the coil and the current flowing in the capacitor means every one period of on and off of the switching element. Further, it is possible to decrease the switching loss because the switching element of the off state is switched to the on state when the current flowing in the coil becomes zero.

In the control device as another aspect of the present invention, the operation means performs the chopper control for the chopper circuit part while considering the voltage of the capacitor means and the voltage of the electric power supply means.

The current of the chopper circuit part during the chopper control depends on the voltage of the capacitor means and the voltage of the electric power supply means. The control device according to the present invention inputs the voltage of the capacitor means and the voltage of the electric power supply means in order to obtain the change of the current during the chopper control. It is thereby possible to effectively adjust the output current of the chopper circuit part to the instruction value.

In the control device as another aspect of the present invention, the operation means performs the chopper control for the chopper circuit part while considering the detection value of the current flowing in the coil in the chopper circuit part.

Because the control device according to the present invention obtains the change of the output current of the chopper circuit part based on the detected value of the current flowing in the coil, it is thereby possible to effectively adjust the output current of the chopper circuit part to the instruction value.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion circuit connected between a voltage battery and a multiphase electric rotary machine, comprising converter unit placed for each of phases other than a predetermined phase of the multiphase electric rotary machine, wherein the converter unit converts a voltage of the voltage battery to a predetermined voltage, and supplying the predetermined voltage to the corresponding phase of the multiphase electric rotary machine, wherein a voltage potential at one terminal in a pair of output terminals of the converter unit is fixed to a voltage potential at one of a pair of electrodes of the voltage battery, and the converter unit adjusts a voltage potential at the other terminal of the converter unit within a range which is greater than a voltage between the pair of the electrodes of the voltage battery in a boundary of a voltage potential at one electrode of the voltage battery, and the predetermined phase of the multiphase electric rotary machine is connected to a node which has the voltage potential of the other electrode of the voltage battery.

2. The electric power conversion circuit according to claim 1, wherein the converter unit comprises:

a capacitor, one of terminals thereof is connected to either a positive electrode or a negative electrode of the voltage battery;

a coil; and a connection means for electrically connecting the coil to the capacitor so that one of the terminals of the capacitor is charged with electric charge corresponding to a voltage potential of one electrode of the voltage battery when the energy in the coil supplied from the voltage battery is output to the capacitor.

3. The electric power conversion circuit according to claim 1, wherein the converter unit comprises:

a capacitor connected in parallel to a pair of output terminals of the converter unit;

a transformer comprised of a primary coil and a secondary coil in which a short circuit is made between one of terminals in the primary coil and one of terminals in the secondary coil having a polarity of a mutually-induced voltage which has an opposite polarity to one of the terminals of the primary coil;

a first switching means opening and closing a first loop circuit composed of the primary coil and the voltage battery; and a second switching means opening and closing a second loop circuit composed of the secondary coil and the capacitor.

4. The electric power conversion circuit according to claim 3, wherein the converter unit further has a first diode and a second diode, the first diode supplies a current flowing in the second loop circuit comprised of the secondary coil and the capacitor by turning off the first switching element connected to the primary coil, and the second diode supplies a current flowing in the first loop circuit comprised of the primary coil and the electric power conversion circuit by turning off the second switching element connected to the secondary coil.

5. The electric power conversion circuit according to claim 1, wherein the converter unit comprises:

a capacitor connected in parallel to a pair of output terminals of the converter unit;

a pair of switching elements connected in parallel to the voltage battery;

a pair of switching elements connected in parallel to the capacitor; and a coil connected between a connection node between the pair of the switching elements connected in parallel to the voltage battery and a connection node between the pair of the switching elements connected in parallel to the capacitor.

6. The electric power conversion circuit according to claim 1, wherein one of phases other than the predetermined phase is connected to either a positive electrode or a negative electrode of the voltage battery.

7. A control device that adjusts control values of a multiphase electric rotary machine by operating the electric power conversion circuit according to claim 1, comprising a control means for using, as an instruction line voltage, a line voltage which is a difference between voltages of two phases in the multiphase electric rotary machine.

8. The control device according to claim 7, further comprising:

setting means for setting an instruction phase voltage to be supplied to the multiphase electric rotary machine; and calculation means for calculating the instruction line voltage on the basis of the instruction phase voltage.

9. The control device according to claim 7, wherein
the converter unit comprises:

a capacitor connected in parallel to the output terminals of the converter unit; and a chopper circuit part placed between the capacitor and the voltage battery, and the control means comprises:

a current instruction value calculation means for calculating an output current instruction value of the chopper circuit part based on the instruction line voltage; and an operation means for performing a chopper control of the chopper circuit part on the basis of the output current instruction value of the chopper circuit part.

10. The control device according to claim 9, wherein the current instruction value calculation means adds a current flowing in the terminals of the multiphase electric rotary machine connected to the capacitor when calculating the output current instruction value of the chopper circuit part.

11. The control device according to claim 7, wherein the control means sets the line voltage of the multiphase electric rotary machine to the instruction line voltage on the basis of the input and output amount of electric charges between the voltage conversion circuit and the multiphase electric rotary machine, and the instruction line voltage to be supplied to the multiphase electric rotary machine.

12. The control device according to claim 11, wherein
the converter unit comprises:

a capacitor connected in parallel to the output terminals of the converter unit; and a chopper circuit part placed between the capacitor and the voltage battery, and the control means comprises:

a current instruction value calculation means for calculating an output current instruction value of the chopper circuit part on the basis of the instruction line voltage and the input and output amount of the electric charge; and an operation means for executing a chopper control of the chopper circuit part on the basis of the output current instruction value of the chopper circuit part.

13. The control device according to claim 9, wherein the current instruction value calculation means calculates the output current instruction value of the chopper circuit on the basis of a difference between an actually-detected line voltage and the instruction line voltage.

14. The control device according to claim 9, wherein the operation means executes the chopper control so that the mean value of the output current of the chopper circuit part during a predetermined period of time is equal to the output current instruction value.

15. The control device according to claim 14, wherein the operation means repeatedly executes the chopper control so that the current flowing in the coil in the chopper circuit part is gradually increased and decreased, and the operation means adjusts the copper control so that the mean value of the output current from the chopper circuit part becomes equal to the output current instruction value during a period of time for the above current increasing and decreasing control in the coil.

16. The control device according to claim 14, wherein the operation means changes the operation state of the switching element in the chopper control so that the mean value of the output current from the chopper circuit part becomes equal to the output current instruction value during a period of on-off operation of the switching element in the chopper circuit part.

17. The control device according to claim 9, wherein the operation means adjusts, as a control value, the on-period of the switching element during the chopper control, and switches the switching element from off-state to on-state by setting the amount of the current flowing in the coil in the chopper circuit part to zero.

18. The control device according to claim 9, wherein the operation means uses the voltage of the capacitor and the voltage of the voltage battery during the chopper control.

19. The control device according to any one of claim 9, wherein the operation means executes the chopper control for the chopper circuit part while considering the detection value of the current flowing in the coil of the chopper circuit part.

20. An electric power conversion circuit connected between a voltage battery and a multiphase electric rotary machine, comprising converter unit placed for each of phases other than a predetermined phase of the multiphase electric rotary machine, wherein the converter unit converts a voltage of the voltage battery to a predetermined voltage, and supplying the predetermined voltage to the corresponding phase of the multiphase electric rotary machine, the predetermined phase is connected to a node having a voltage potential of a phase other then the predetermined phase by applying the voltage of the converter unit, and wherein the converter unit comprises:
- a capacitor;
- a transformer comprised of a primary coil and a secondary coil, the primary coil and the secondary coil being connected in parallel to the voltage battery, and the primary coil being connected in parallel to the voltage battery;
- a first switching element for opening and closing a connection between the primary coil in the transformer and a positive electrode terminal of the voltage battery;
- a second switching element for opening and closing a connection between the capacitor and a connection node between the primary switching element and the primary coil; and
- a third switching element for opening and closing a connection between a negative electrode terminal of the voltage battery and one of terminals of the secondary coil in the transformer having a same voltage potential of a mutually induced voltage at the terminal in the primary coil connected to the first switching element.

21. The electric power conversion circuit according to claim 20, wherein one of phases other than the predetermined phase is connected to either a positive electrode or a negative electrode of the voltage battery.

22. The electric power conversion circuit according to claim 20, wherein one of phases other than the predetermined phase is connected to a connection node between plural capacitors connected in parallel to the voltage battery.

* * * * *